(12) United States Patent
Pullins et al.

(10) Patent No.: US 10,343,008 B2
(45) Date of Patent: Jul. 9, 2019

(54) SQUAT EXERCISE APPARATUS

(71) Applicant: Precor Incorporated, Woodinville, WA (US)

(72) Inventors: Bradly J. Pullins, Burlington, NC (US); Mickey Jay Hall, Sparta, NC (US); Roy R. Simonson, Colorado Springs, CO (US)

(73) Assignee: Precor Incorporated, Woodinville, WA (US)

( * ) Notice: Subject to any disclaimer, the term of this patent is extended or adjusted under 35 U.S.C. 154(b) by 44 days.

(21) Appl. No.: 15/164,719

(22) Filed: May 25, 2016

(65) Prior Publication Data

US 2016/0346586 A1 Dec. 1, 2016

Related U.S. Application Data

(60) Provisional application No. 62/166,246, filed on May 26, 2015.

(51) Int. Cl.
*A63B 23/04* (2006.01)
*A63B 21/00* (2006.01)
(Continued)

(52) U.S. Cl.
CPC .... *A63B 21/0615* (2013.01); *A63B 21/00065* (2013.01); *A63B 21/4033* (2015.10);
(Continued)

(58) Field of Classification Search
CPC ............ A63B 21/0615; A63B 21/4033; A63B 21/00065; A63B 23/03525; A63B 23/0405; A63B 21/4034; A63B 21/4035; A63B 21/4039; A63B 21/4047; A63B 17/04; A63B 21/00061; A63B 21/00192; A63B 21/0051; A63B 21/0083; A63B 21/0087;
(Continued)

(56) References Cited

U.S. PATENT DOCUMENTS 3,635,472 A * 1/1972 Marcyan ................ A63B 21/06
482/101
3,638,941 A * 2/1972 Kulkens ........... A63B 21/00072
482/113
(Continued)

*Primary Examiner* — Andrew S Lo
(74) *Attorney, Agent, or Firm* — Terence P. O'Brien; Todd A. Rathe

(57) ABSTRACT

A squat exercise apparatus may comprise a support structure, a user adjustable resistance source and lift arms supported by the support structure and operably coupled to the user adjustable resistance source. In one implementation, the lift arms may be pivotable relative to the support structure about three orthogonal axes. In one implementation, shoulder pads carried by the lift arms may automatically pivot in response to pivoting of the lift arms relative to the support structure. In one implementation, at least one weight movement arm may have an adjustable length. In one implementation, a weight movement arm rest may be pivotable between a weight movement arm engaging position and a retracted position, wherein interacting portions of the weight movement arm rest and the weight movement arm are magnetically attracted to one another to magnetically retain the weight movement arm rest in the weight movement arm engaging position.

22 Claims, 24 Drawing Sheets

(51) Int. Cl.
  *A63B 23/035* (2006.01)
  *A63B 21/06* (2006.01)
  *A63B 71/00* (2006.01)
  *A63B 17/04* (2006.01)
  *A63B 21/005* (2006.01)
  *A63B 21/008* (2006.01)
  *A63B 21/02* (2006.01)
  *A63B 21/04* (2006.01)
  *A63B 21/055* (2006.01)
  *A63B 23/02* (2006.01)
  *F16B 7/10* (2006.01)

(52) U.S. Cl.
  CPC .... *A63B 23/03525* (2013.01); *A63B 23/0405* (2013.01); *A63B 17/04* (2013.01); *A63B 21/0051* (2013.01); *A63B 21/00061* (2013.01); *A63B 21/0083* (2013.01); *A63B 21/0087* (2013.01); *A63B 21/00192* (2013.01); *A63B 21/026* (2013.01); *A63B 21/0421* (2013.01); *A63B 21/0552* (2013.01); *A63B 21/152* (2013.01); *A63B 21/4034* (2015.10); *A63B 21/4035* (2015.10); *A63B 21/4039* (2015.10); *A63B 21/4047* (2015.10); *A63B 23/0233* (2013.01); *A63B 71/0036* (2013.01); *A63B 2023/0411* (2013.01); *A63B 2225/09* (2013.01); *A63B 2225/093* (2013.01); *F16B 7/105* (2013.01)

(58) Field of Classification Search
  CPC .............. A63B 21/026; A63B 21/0421; A63B 21/0552; A63B 21/152; A63B 23/0233; A63B 71/0036; A63B 2023/0411; A63B 2225/09; A63B 2225/093; F16B 7/105
  USPC ............................................ 482/94, 118, 137
  See application file for complete search history.

(56) References Cited

U.S. PATENT DOCUMENTS

| | | | | |
|---|---|---|---|---|
| 3,905,599 A * | 9/1975 | Mazman | A63B 21/00072 | 482/98 |
| 4,208,049 A * | 6/1980 | Wilson | A63B 21/04 | 384/49 |
| 4,241,913 A * | 12/1980 | Zwayer | A63B 21/0083 | 482/113 |
| 4,275,882 A * | 6/1981 | Grosser | A63B 21/00072 | 482/112 |
| 4,357,010 A * | 11/1982 | Telle | A63B 21/00072 | 482/113 |
| 4,357,011 A * | 11/1982 | Voris | A63B 21/4005 | 482/139 |
| 4,358,107 A * | 11/1982 | Nissen | A63B 21/0615 | 482/127 |
| 5,050,868 A * | 9/1991 | Pearson | A63B 21/0615 | 482/104 |
| 5,058,888 A * | 10/1991 | Walker | A63B 23/00 | 482/112 |
| 5,072,932 A * | 12/1991 | Johnson | A63B 21/023 | 482/128 |
| 5,085,430 A | 2/1992 | Habing | | |
| 5,336,148 A * | 8/1994 | Ish, III | A63B 21/0632 | 482/137 |
| 5,509,876 A * | 4/1996 | Reyes | A63B 21/078 | 482/104 |
| 5,529,558 A * | 6/1996 | Koenig | A63B 21/0615 | 482/137 |
| 5,597,257 A | 1/1997 | Habing | | |
| 5,628,715 A * | 5/1997 | Simonson | A63B 21/0615 | 482/134 |
| 5,702,329 A * | 12/1997 | Koenig | A63B 21/0615 | 482/137 |
| 5,803,882 A | 9/1998 | Habing et al. | | |
| 5,885,193 A | 3/1999 | Habing et al. | | |
| 5,897,467 A | 4/1999 | Habing et al. | | |
| 5,967,954 A | 10/1999 | Habing | | |
| 5,971,895 A | 10/1999 | Habing | | |
| 6,080,091 A | 6/2000 | Habing et al. | | |
| 6,251,052 B1 * | 6/2001 | Simonson | A63B 23/0405 | 482/100 |
| 6,394,936 B1 * | 5/2002 | Voris | A63B 21/155 | 482/100 |
| 6,447,433 B1 * | 9/2002 | Reyes | A63B 21/078 | 482/104 |
| 6,471,624 B1 * | 10/2002 | Voris | A63B 21/00047 | 482/136 |
| 6,802,800 B1 * | 10/2004 | Hobson | A63B 21/0615 | 482/137 |
| 6,921,356 B1 | 7/2005 | Habing et al. | | |
| 7,090,623 B2 | 8/2006 | Stewart et al. | | |
| 7,104,936 B2 * | 9/2006 | Karlstrom | A63B 21/0083 | 482/112 |
| 7,115,080 B2 * | 10/2006 | Cockrill, Jr. | A63B 23/0405 | 482/138 |
| 7,357,759 B2 * | 4/2008 | Bonnell | A63B 23/0494 | 482/121 |
| 7,608,020 B2 * | 10/2009 | Mason | A63B 21/0615 | 482/105 |
| 8,172,731 B1 * | 5/2012 | Bredda | A63B 21/00065 | 482/94 |
| 8,641,587 B2 * | 2/2014 | Hongo | A63B 21/00072 | 482/131 |
| 8,992,393 B2 * | 3/2015 | Reyes | A63B 21/08 | 482/100 |
| 9,457,219 B2 * | 10/2016 | Smith | A63B 23/03525 | |
| 2001/0018387 A1 * | 8/2001 | Webber | A63B 21/078 | 482/142 |
| 2004/0147376 A1 * | 7/2004 | Gautier | A63B 23/1245 | 482/93 |
| 2004/0259700 A1 * | 12/2004 | Stewart | A63B 23/12 | 482/122 |
| 2005/0032611 A1 * | 2/2005 | Webber | A63B 23/1254 | 482/72 |
| 2005/0277526 A1 * | 12/2005 | Bonnell | A63B 23/0494 | 482/123 |
| 2007/0072694 A1 * | 3/2007 | Meneghini | A63B 69/365 | 473/259 |
| 2007/0093363 A1 * | 4/2007 | Sharps | A63B 23/03525 | 482/94 |
| 2007/0232464 A1 * | 10/2007 | Chu | A63B 21/00072 | 482/96 |
| 2009/0170674 A1 * | 7/2009 | Chu | A63B 21/068 | 482/138 |
| 2011/0207584 A1 * | 8/2011 | Webber | A63B 21/0615 | 482/94 |
| 2012/0015777 A1 * | 1/2012 | Goel | A63B 23/02 | 482/4 |
| 2012/0225756 A1 * | 9/2012 | Reyes | A63B 21/078 | 482/104 |
| 2012/0238418 A1 * | 9/2012 | Reyes | A63B 21/08 | 482/121 |
| 2013/0137551 A1 * | 5/2013 | Goel | A63B 23/02 | 482/5 |
| 2013/0296143 A1 * | 11/2013 | Staten | A63B 21/0618 | 482/98 |
| 2014/0005016 A1 * | 1/2014 | Hongo | A63B 21/00072 | 482/131 |
| 2014/0073492 A1 * | 3/2014 | Hunter | A63B 21/0615 | 482/98 |
| 2014/0200117 A1 * | 7/2014 | Grider | A63B 17/04 | 482/104 |
| 2015/0111708 A1 * | 4/2015 | Smith | A63B 23/03525 | 482/98 |

* cited by examiner

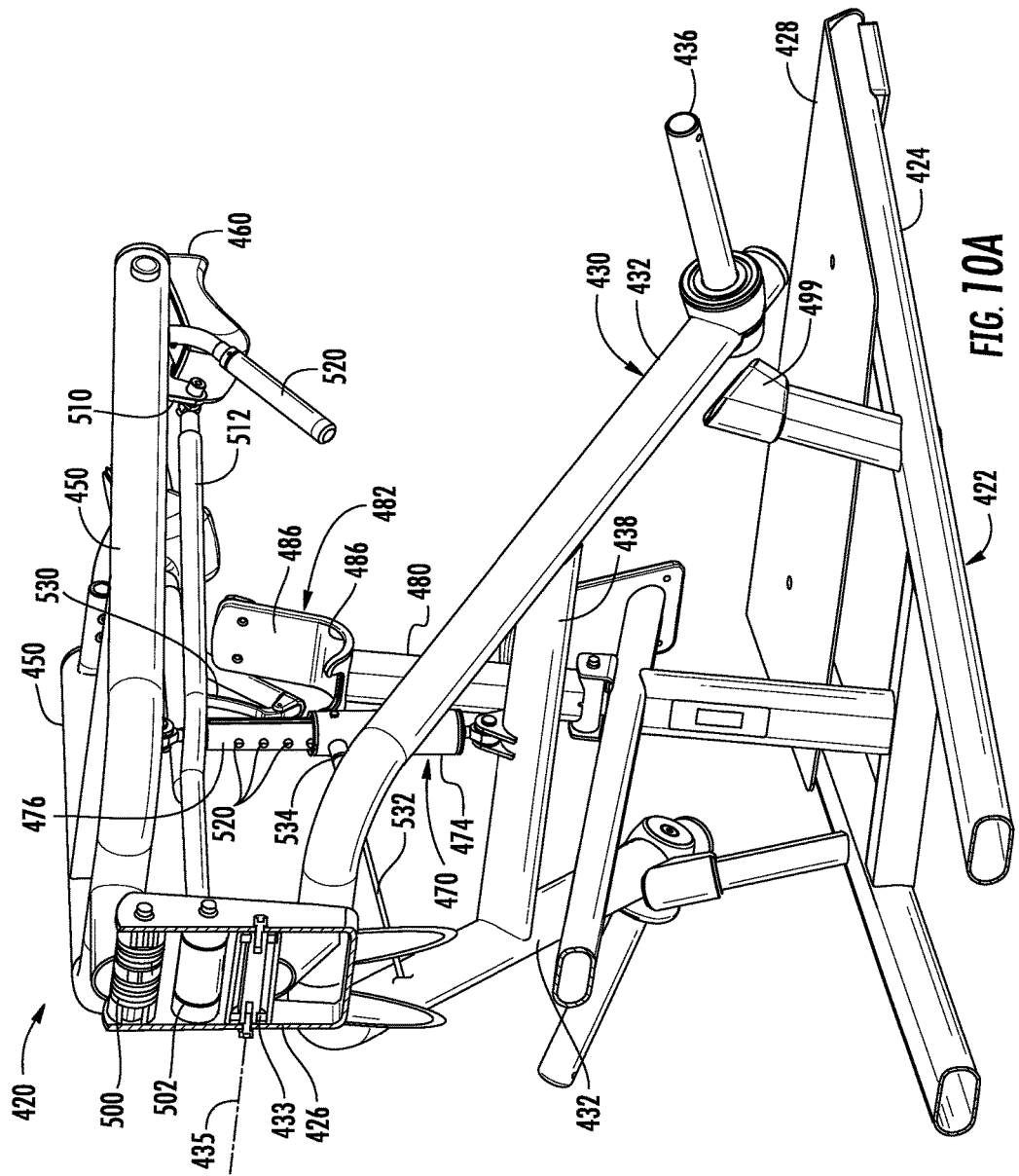

SQUAT EXERCISE APPARATUS

BACKGROUND

The "squat" exercise is an exercise utilized to strengthen, tone and rehabilitate muscles such as muscles of the leg including a person's quadriceps, hamstrings and calves. When engaged in a "squat" exercise, a person raises and/or lowers a resistance load by the moving his or her hips and legs between a lowered position and an upright position while maintaining proper stance, posture and movement. Maintaining the proper stance, posture and movement during a "squat" exercise is sometimes difficult.

BRIEF DESCRIPTION OF THE DRAWINGS

FIG. 10A is a front perspective view of the squat exercise apparatus of FIG. 9 with portions shown in section.

DETAILED DESCRIPTION OF EXAMPLES

Figure 1:
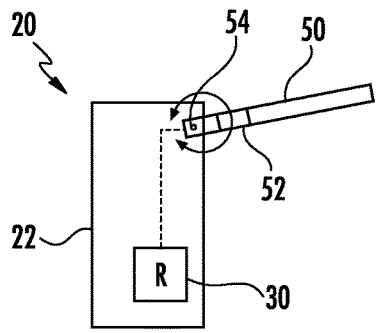
FIG. 1 is a side view schematically illustrating an example squat exercise apparatus.
Figure 2:
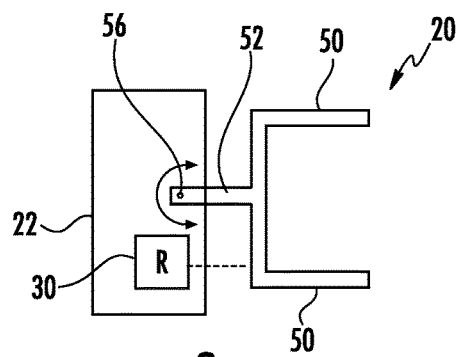
FIG. 2 is a top view schematically illustrating the example squat exercise apparatus of FIG. 1.
Figure 3:
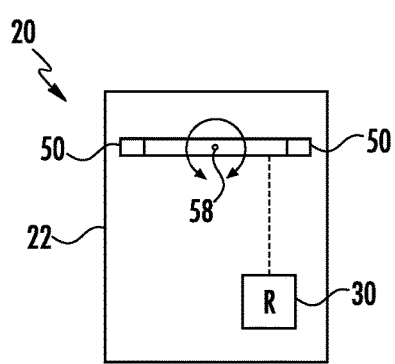
FIG. 3 is a front view schematically illustrating the example squat exercise apparatus of FIG. 1.

FIGS. 1-3 schematically illustrate an example squat exercise apparatus 20. Exercise apparatus 20 facilitates a squat exercise by a person while assisting the person in maintaining proper stance, posture and movement. At the same time, exercise apparatus 20 provides controlled multi-axial freedom of motion to accommodate individual differences between different persons or lifters and to provide such lifters with an enhanced feel, similar to free weights. Exercise apparatus 20 comprises support structure 22, user adjustable resistance source 30, and lift arms 50.

Support structure 22 (schematically illustrated) comprises a base, frame or other structures to stably support the remaining components of exercise apparatus 20 upon an underlying surface or to suspend the remaining components of exercise apparatus 20 from an overlying ceiling or structure. Support structure 22 may have a variety of different sizes, shapes and configurations. In one implementation, support structure 22 comprises a platform upon which a lifter may stand. In another implementation, support structure 22 may omit such a platform.

User adjustable resistance source 30 (schematically illustrated) comprises an adjustable source of resistance against movement of lift arms 50. Resistance source 30 is configured to allow a lifter to selectively adjust the amount or degree of resistance provided by source 30 against movement of lift arms 50. In one implementation, the user adjustable resistance source 30 comprises at least one weight bar or post to be inserted through openings in user selected weight plates, wherein the weight bar or post is operably coupled to lift arms 50 so as to move in response to movement of lift arms 50 and so as to be lifted with the force applied to lift arms 50.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

In another implementation, user adjustable resistance source 30 comprises at least one resiliently stretchable member, such as a spring or elastic, rubber-like member, operably coupled to lift arms 50 so as to be stretched in response to movement a lift arms 50 and with the force applied to lift arms 50 by the lifter. In such an implementation, user may select between various different resilient stretchable members to provide different degrees of resistance. In still another implementation, user adjustable resistance source 30 comprises a hydraulic or pneumatic cylinder-piston assembly operably coupled to lift arms 50, where the user may select or exchange different cylinder-piston assemblies. In still other implementations, user adjustable resistance source 30 comprises an electromechanical resistance source operably coupled to lift arms 50 which provides a user adjustable degree or level of resistance against movement of lift arms 50 through the application of different degrees or levels of magnetic force or eddy currents. In still other implementations, user adjustable resistance source 30 comprises a stack of weights, wherein source 30 is configured to allow the user are lifter to select what portion of the stack of weights is operably coupled to lift arms 50 so as be lifted in response to movement of lift arms 50.

Lift arms 50 comprise members that are movably supported by support structure 22 and that extend from support structure 22 for being moved under the influence of force from a lifter. In one implementation, lift arms 50 each have a lower surface to overlie and contact shoulders of a lifter. In one implementation, such lift arms 50 have shoulder pads to bear against the upper surfaces of the lifter shoulders. In yet other implementations, lift arms 50 are configured to be grasped by a person's hands raised at or above his or her shoulders during lifting. In one implementation, lift arms 50 comprise portions of a bar that laterally extend across the lifter at or above his or her shoulders, either on a front side or a rear side of the lifter.

In the example illustrated, lift arms 50 extend from a single post 52 which is movably connected to support structure 22. As shown by FIGS. 1-3, post 52 is pivotably connected to and supported by support structure 22 for being pivoted relative to support structure 22 about three axes: a first horizontal axis 54 (as seen in the side view of apparatus 20 shown in FIG. 1); a vertical axis 56, orthogonal to axis 54 (as seen in the top view of apparatus 20 shown in FIG. 2); and a second horizontal axis 58, orthogonal to axis 54 and axis 56 (as seen in the front view of apparatus 20 shown in FIG. 3). During a squat exercise, lift arms 50 pivot about axis against the user selected resistance applied by resistance source 30. During the squat exercise, lift arms 50 may pivot about axis 56 to provide limited or controlled sideways freedom of motion. During the squat exercise, lift arms 50 may additionally pivot or twist about axis 58, providing limited or controlled freedom of motion about axis 58 such as where the height of the lifter shoulders may be temporarily different during the squat exercise. Because lift arm 50 is pivotable about three orthogonal axes, squat exercise apparatus 20 provides enhanced freedom of motion for improved feel for the lifter.

In one implementation, post 52 and lift arms 50 are operably coupled to support structure 22 by at least one universal joint, providing pivoting motion about three orthogonal axes. In one implementation, post 52 and lift arms 50 are operably coupled to support structure 22 by at least one spherical bearing. In yet other implementations, post 52 and lift arms 50 are operably coupled to support structure 22 by multiple interconnected bearings that provide bearing support about each of the three orthogonal axes.

Figure 4:
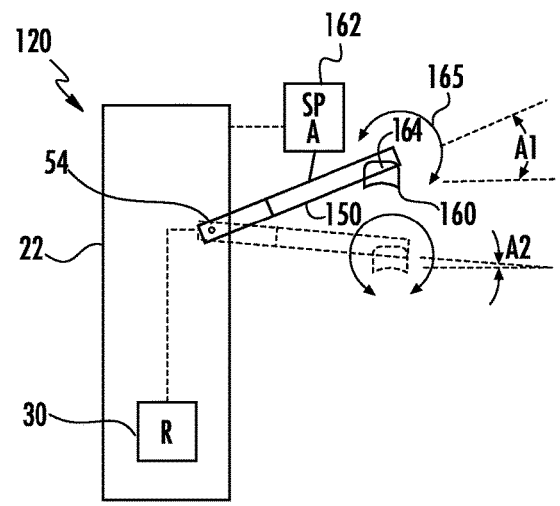
FIG. 4 is a side view schematically illustrating another example squat exercise apparatus.

FIG. 4 schematically illustrates squat exercise apparatus 120. Squat exercise apparatus 120 provides shoulder pads having orientations that automatically adjust during a squat exercise. Squat exercise apparatus 120 comprises support structure 22 (described above), resistance source 30 (described above), lift arms 150, shoulder pads 160 and shoulder pad adjusters 162 (schematically shown). Lift arms 150 comprise members that are movably supported by support structure 22 and that extend from support structure 22 for being moved under the influence of force from a lifter. Lift arms 150 support shoulder pads 160 for contacting the upper surfaces of a person shoulders during a squat exercise. In one implementation, lift arms 150 are similar to lift arms 50 described above, wherein lift arms 150 are pivotally supported for movement about three orthogonal axes. In yet other implementations, lift arms 150 are pivotably supported for movement about to axes such as axes 54 and 56 or for movement about a single axis, such as axis 54 during a squat exercise.

Shoulder pads 160 comprise pads to contact upper surfaces of a lifter shoulders during a squat exercise. In one implementation, shoulder pads 160 each have a downward facing concave recess or channel to receive a lifter shoulders. In one implementation, shoulder pads 160 have downwardly facing flat surfaces. In one implementation, the downwardly facing surfaces of shoulder pads 160 are soft or resiliently compressible. For example, in one implementation, such downwardly facing surfaces are backed by foam or other resiliently compressible material. In other implementations, shoulder pads 160 are not compressible.

Shoulder pads 160 are each pivotably coupled to and supported by lift arms 150. In the example illustrated, shoulder pads 160 are each pivotable about a horizontal axis 164 as indicated by arrows 165. As a result, shoulder pads 160 may be angularly oriented or repositioned to accommodate individual characteristics of a lifter.

Shoulder pad adjuster 162 comprises a mechanism that automatically adjusts or changes the angular orientation of each of shoulder pads 160, with respect to axis 164, in response to pivoting of lift arms 150 about axis 54. In other words, during pivotal movement of lift arms 150, shoulder pad adjuster 162 automatically reorients shoulder pads 160 to achieve a desired angular orientation of shoulder pads 160 despite such movement of lift arms 150.

FIG. 4 illustrates two different angular positions of lift arms 150 and the corresponding two different angular positions of shoulder pads 160 relative to movement arms 150. When lift arms 150 are in a first angular position shown in solid lines, shoulder pads 160 are at an angle A1 with respect to lift arms 150. When lift arms 150 are in a second angular position shown in broken lines, shoulder pads 160 are at an angle A2, different than angle A1, with respect to lift arms 150. In one implementation, in each of the two illustrated positions, shoulder pads 160 are at the same angular orientation relative to support structure 22 despite the changes in the angular orientations of lift arms 150. In other implementations, shoulder pads 160 may be at different angular orientations with respect to support structure 22 at each of the two illustrated positions of movement arms 150.

In one implementation, shoulder pad adjuster 162 comprises at least linkage pivotably connected to each of shoulder pads 160 and further pivotably connected to support structure 22 so as to maintain a selected orientation of shoulder pads 160 with respect to support structure 22 despite pivoting movement of lift arms 150. In one implementation, is arranged as part of a four bar linkage. In still other implementations, shoulder pad adjuster 162 comprises at least one linkage extending between shoulder pads 160 and lift arms 150. In still other implementations, shoulder pad adjuster 162 comprises a sensor that senses angular positioning of lift arms 150 and a powered actuator that moves or pivots shoulder pads 162 a desired angular orientation based upon the sensed angular positioning of lift arms 150.

Figure 5:
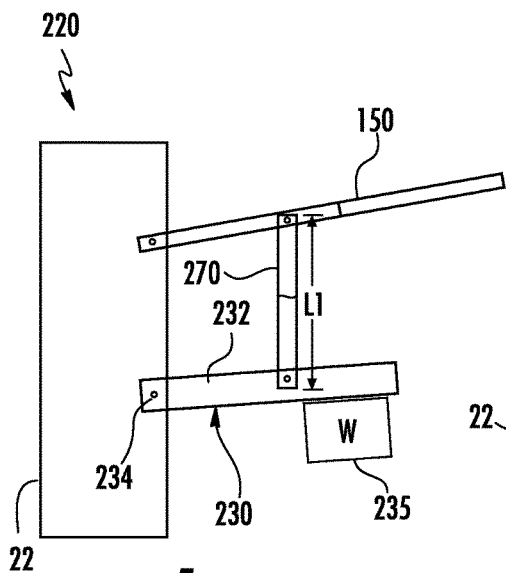
FIG. 5 is a side view schematically illustrating another example squat exercise apparatus in a first state.
Figure 6:
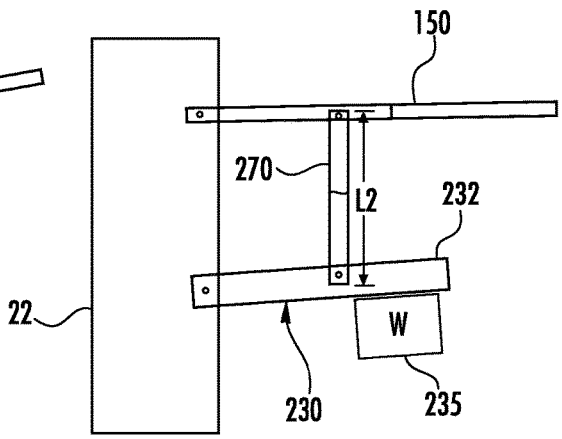
FIG. 6 is a side view schematically illustrating the squat exercise apparatus of FIG. 5 in a second state.

FIGS. 5 and 6 schematically illustrate squat exercise apparatus 220. Squat exercise apparatus 220 comprises support structure 22 (described above), user adjustable resistance source 230, lift arms 150 (described above) and lift coupler 270. User adjustable resistance source 230 comprises an adjustable source of resistance against movement of lift arms 150. Resistance source 230 is configured to allow a lifter to selectively adjust the amount or degree of resistance provided by source 230 against movement of lift arms 150. User adjustable resistance source 230 comprises at least one weight movement arm 232. Weight movement arm 232 is pivotally supported by support structure 22 for pivotable movement about axis 234. Weight movement arm 232 is configured to be releasably connected to or to removably support at least one user adjustable weight 235. In one implementation, each weight movement arm 232 comprises at least one weight bar or post for receiving one or more weight plates or extending through openings in one or more user selected weight plates. In another implementation, weight movement arm 232 is operably coupled, through the use of cables, linkages or the like, to a stack of weights, a hydraulic or pneumatic cylinder piston assembly, and electro mechanical resistance source, a resiliently stretchable member and/or other resistance mechanisms which would oppose lifting of weight movement arm 232 and lift arms 150.

Lift coupler 270 operably couples weight movement arm 232 to lift arms 150 such that weight movement arm 232 and weight 235 are raised and lowered in response to movement of lift arms 150 through the application of force applied to lift arms 150. In one implementation, lift coupler 270 comprises at least one linkage or bar pivotably connected to weight movement arm 232 at a first end portion and pivotably connected to lift arms 150 at a second end portion.

As shown by FIGS. 5 and 6, lift coupler 270 has an adjustable length. FIG. 5 illustrates lift coupler 270 adjusted to a first length L1 while FIG. 6 illustrates lift coupler 270 adjusted to a second shorter length L2. The adjustable length of lift coupler 270 facilitates movement of lift arms 150 relative to weight movement arm 232 without movement of weight movement arm 232 or weight 235. As a result, lift arms 150 may be adjusted to a desired starting height at the beginning of a squat exercise. Such adjustment defines a range during initial setup. In one implementation, lift coupler 270 comprises a plurality of telescopic rods, bars or linkages which are telescopic the adjustable rods, bars or linkages provide different lengths for lift coupler 270. In other implementations, lift coupler 270 may have other forms for providing an adjustable length.

Figure 7:
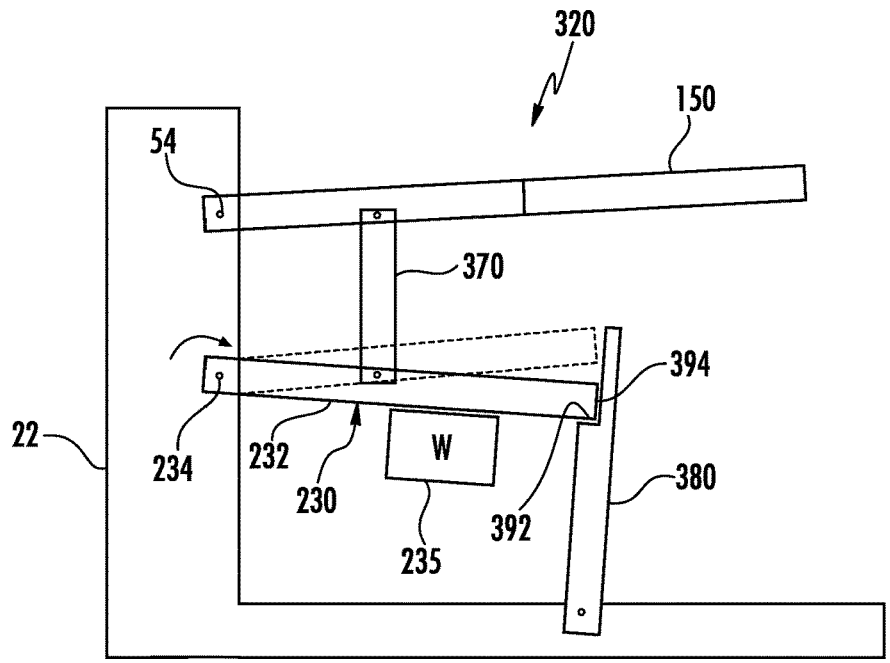
FIG. 7 is a side view schematically illustrating another example squat exercise apparatus in a first state.
Figure 8:
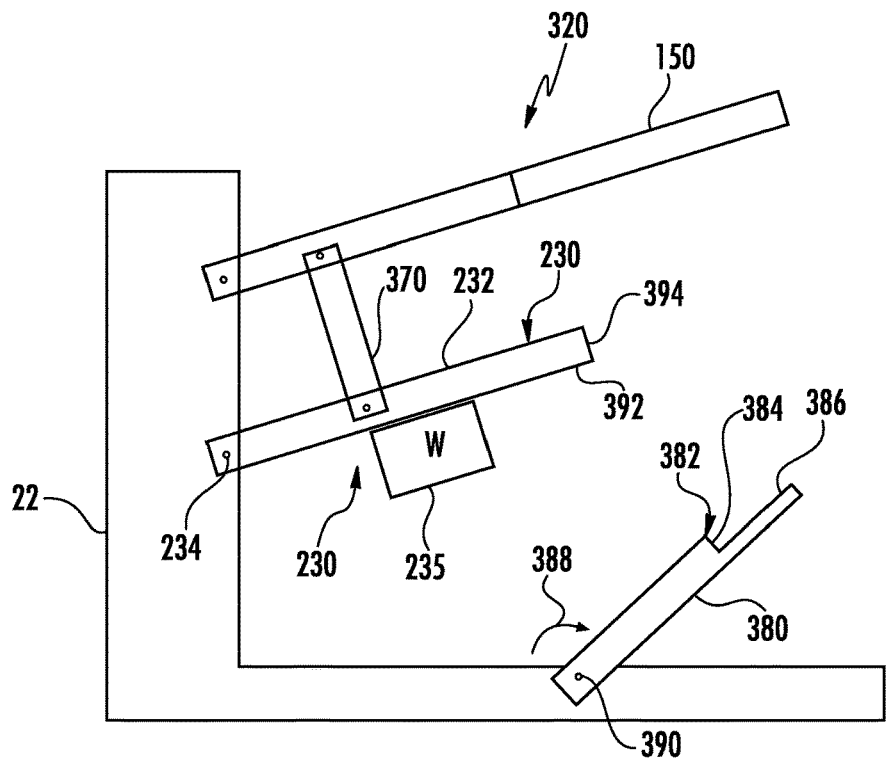
FIG. 8 is a side view schematically illustrating the squat exercise apparatus of FIG. 7 in a second state.

FIGS. 7 and 8 schematically illustrate squat exercise apparatus 320. Squat exercise apparatus 320 comprises support structure 22 (described above), user adjustable resistance source 230 (described above), lift arms 150 (described above), lift coupler 370 and weight movement arm support 380. Lift coupler 370 operably couples weight movement arm 232 to lift arms 150 such that weight movement arm 232 and weight 235 are raised and lowered in response to movement of lift arms 150 through the application of force applied to lift arms 150. In one implementation, lift coupler 270 comprises at least one linkage or bar pivotably connected to weight movement arm 232 at a first end portion and pivotably connected to lift arms 150 at a second end portion. In one implementation, lift coupler 370 is similar to lift coupler 270 described above, wherein lift coupler 370 has an adjustable length. In other implementations, lift coupler 370 is not provided with an adjustable length.

Weight movement arm support 380 comprises a structure or member pivotably coupled to support structure 22 so as to be movable or pivotable between a weight movement arm engaging position shown in FIG. 7 and a retracted position shown in FIG. 8. Weight movement arm support 380 comprises an armrest 382 having a floor surface 384 and an upstanding wall surface 386. As shown by FIG. 7, armrest 382 contacts and receives weight movement min 232 to support weight movement arm 232 in initial starting position or when a squat exercise is not being carried out. As shown by FIG. 8, upon pivoting of lift arms 150 and weight movement arm 232 during a squat exercise, weight movement arm 232 is moved out of engagement with armrest 382, allowing weight movement arm support 380 to pivot in the direction of arrow 388 about axis 390 to the disengaged or retracted state. In other implementations, the direction of arrow 388 can be in an opposite direction, or any other direction so as to reposition the arm support 380 away from the weight movement arm 232 in a manner that is convenient and does not interfere with the use of the apparatus 320 by the user. It is preferably that the direction of arrow 388 allows the user to easily reposition arm support 380 back to an upright position when he or she is completing his or her squat exercise. Following such retraction, during the squat exercise, weight movement arm 380 may be lowered to a height below the arm supporting height of armrest 382 shown in FIG. 7. As a result, lift arms 150 and weight movement arm 232 are supported at an intermediate height that is above a low end of the range of motion of lift arms 150 and arm 232, but that is below the upper end of the range of motion lift arms 150 and arm 232. Disengagement from arm support 380 is achieved by simple lifting of lift arms 150. The disengagement of the arm support 380 from the lift arms 150 can be accomplished manually or automatically.

In the example illustrated, interacting portions of weight movement arm 232 and weight movement arm support 380 are magnetically attracted to one another. For example, in one implementation, portions of surface 384, surface 386 and/or corresponding surfaces 392, 394 are magnetic. Such magnetic attraction assists in retaining weight movement arm 232 in engagement with rest 382 and further assist in retaining weight movement arm support 380 in the engaged state shown in FIG. 7 until weight movement arm 232 is lifted out of engagement with arm support 380.

In one implementation each of such surfaces is magnetic; portions of weight movement arm 232 having a first magnetic polarity and corresponding portions of arm support 380 having a second opposite magnetic polarity. In another implementation, portions of one of weight movement arm 232 and arm support 380 are magnetic while the corresponding portions of the other of weight movement arm 232 and arm support 380 are ferrous. For purposes of this disclosure, a surface is magnetic if a magnetic field is present at the surface. For example, surfaces 384, 386 and/or surfaces 392, 394 may have a magnet coated with a rubber or other layer of non-magnetic material, wherein the coating or layer is sufficiently thin such that the magnetic field is present at such surfaces.

In the example illustrated, surfaces 386 and 394 are magnetically attracted to one another. As shown by broken lines in FIG. 7, this magnetic attraction retains weight movement arm support 380 in the engaged state shown in FIG. 7 even when weight movement arm 232 is no longer resting upon surface 384 or upon (on top of) rest 382. As a result, weight movement arm support 380 is magnetically retained in the engaged position or state during initial lifting of lift arms 150 and weight movement arm 232 to start a squat exercise, ready to capture weight movement arm 232 despite separation from floor surface 384. Conversely, when a lifter is finishing a squat exercise and has manually pivoted weight movement arm support 380 to the engaged position, upright wall portion or surface 386 is magnetically held against surface 394 of weight movement arm 232 as lift arms 150 and weight movement arm 232 is in the progress of being lowered towards and onto floor surface 384 of support 380. Such magnetic attraction allows a lifter to no longer hold support 380 as he or she lowers weight movement arm 232. Such magnetic attraction further assist in ensuring complete aligned reception of weight movement arm 232 by rest 382 of support 380. In other implementations, the support 380 can be releasably engaged with weight movement arm 232 through other mechanisms, such as, for example, releasable connectors, hook and loop connectors, tongue and groove connections, interference fits, snap-fit connections, and combinations thereof.

FIGS. 9-13 illustrate squat exercise apparatus 420, an example of each of squat exercise apparatuses 20, 120, 220 and 320 described above. As with squat exercise apparatus 20, squat exercise apparatus 420 provides lift arms that are pivotable relative to a support structure about three orthogonal axes. As with squat exercise apparatus 120, squat exercise apparatus 420 has shoulder pads that have orientations that automatically adjust based upon movement of the lift arms supporting such shoulder pads. As with squat exercise apparatus 220, squat exercise apparatus 420 utilizes a lift coupler having an adjustable length. As with squat exercise apparatus 320, squat exercise apparatus 420 utilizes a weight support that is magnetically attracted to a weight movement arm.

Squat exercise apparatus 420 comprises support structure 422, user adjustable resistance source 430, lift arms 450, shoulder pads 460, shoulder pad actuator or adjuster 462, lift coupler 470, lift coupler actuator 472, weight movement arm support 480 and weight movement arm stops 499. Support structure 422 comprises a base, frame or other structures to stably support the remaining components of exercise apparatus 420 upon an underlying surface or to suspend the remaining components of exercise apparatus 420 from an overlying ceiling or structure. In the example illustrated, support structure 422 comprises base 424, tower 426 and platform 428.

Base 424 rests upon an underlying support surface or floor and holds tower 426 in an upright or vertical orientation also supporting platform 428. Tower 426 extends upwardly from base 424 and pivotably supports user adjustable resistance source 430 and lift arms 450. Platform 428 comprises a surface situated below shoulder pads 460 upon which a person stands during a squat exercise using apparatus 420. In some implementations, platform 428 is omitted where the person exercising, the lifter, stands upon the floor other surface upon which base 424 rests. In other implementations, support structure 422 may have a variety of other sizes, shapes and configurations.

User adjustable resistance source 430 is similar to user adjustable resistance source 230 described above. User adjustable resistance source 430 comprises a pair of weight movement arms 432 symmetrically arranged with respect to a centerline of apparatus 420. Weight movement arms 432 are operably coupled to tower 426 by a post 434 which is pivotably connected to tower 426. As shown by FIG. 10A, a sectional view of apparatus 420, weight movement arms 432 and post 434 are pivotably coupled to tower 426 by bearing assembly 433 for pivotal movement about axis 435. In other implementations, weight movement arms 432 and post 434 are pivotably coupled to tower 426 for pivotal movement about multiple axes, such as multiple orthogonal axes. In the example illustrated, each of weight movement arms 432 comprises a weight plate bar or post 436 upon which user selected weight plates may be positioned. In the example illustrated, arms 430 are joined by an intermediate connection bar 438.

Figure 9:
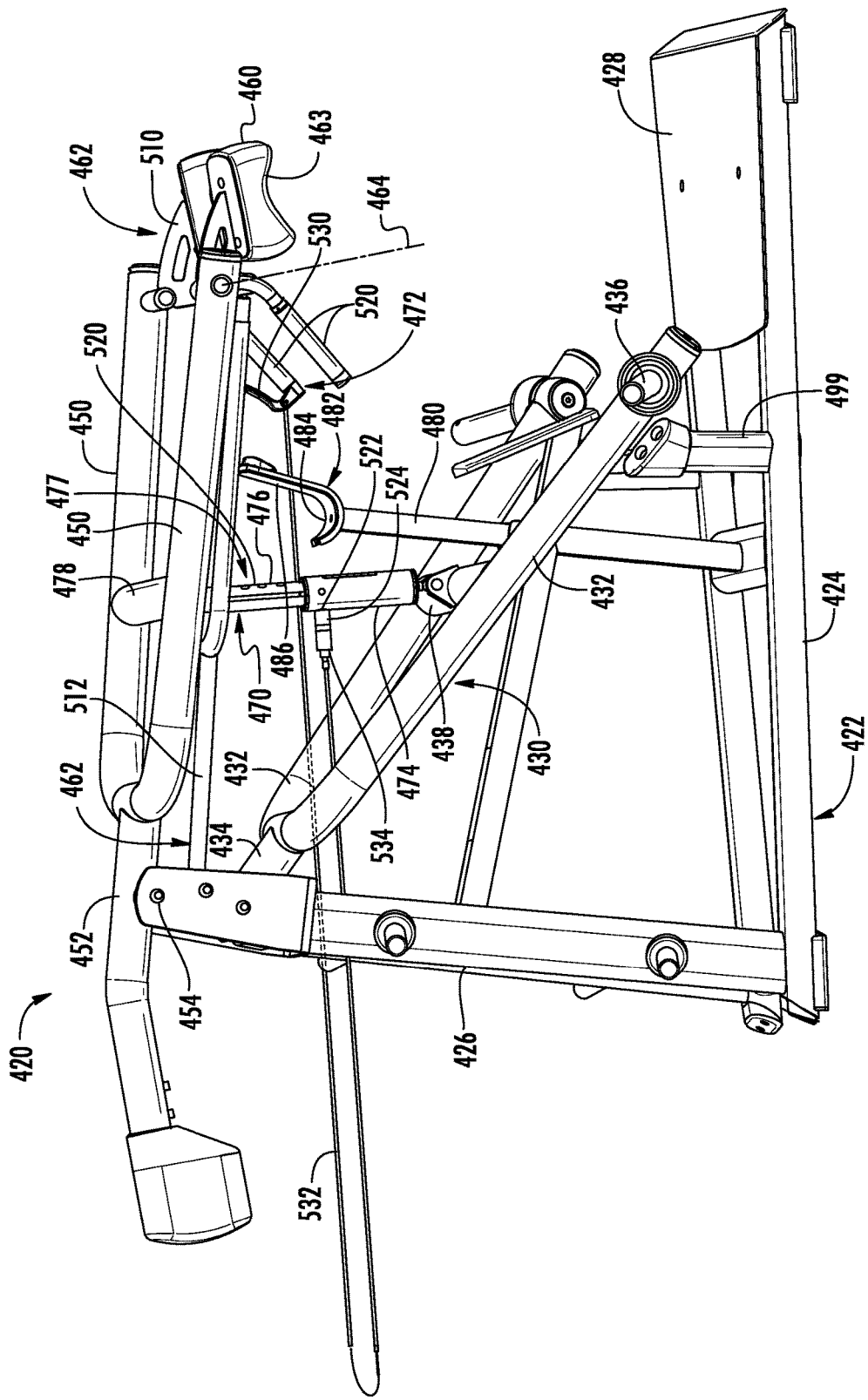
FIG. 9 is a side perspective view of another example squat exercise apparatus.
Figure 10:
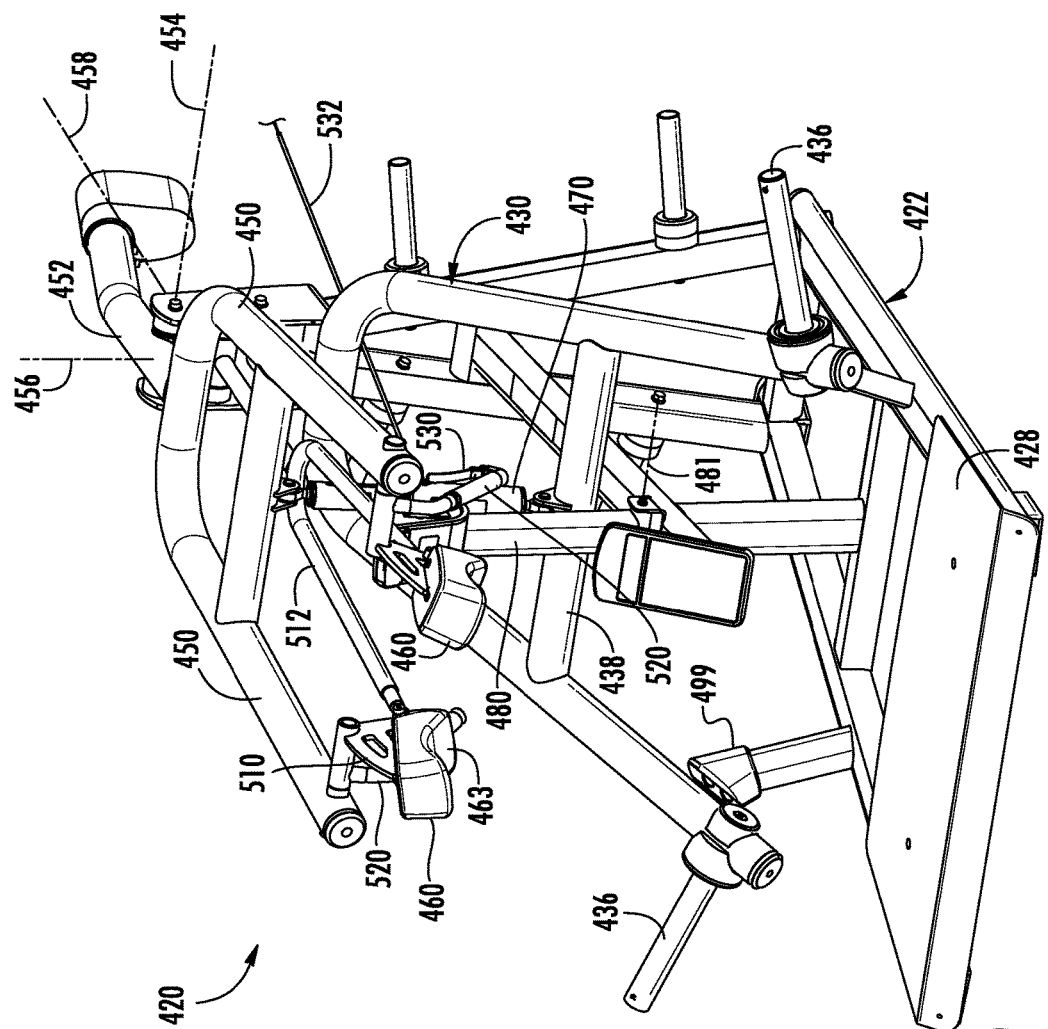
FIG. 10 is a rear perspective view of the squat exercise apparatus of FIG. 9.

Lift arms 450 are similar to lift arms 50 described above. Lift arms 450 comprise members that are movably supported by support structure 422 and that extend from support structure 422 for being moved under the influence of force from a person engaged in the squat exercise. Lift arms 450 pivotably support shoulder pads 460. In the example illustrated, lift arms 450 extend from a single post 452 which is movably connected to support structure 422. As with posts 52 associated with lift arms 50, post 452 is pivotably connected to and supported by support structure 422 for being pivoted relative to support structure 422 about three axes: a first horizontal axis 454 (as seen in FIGS. 9 and 10); a vertical axis 456, orthogonal to axis 454 (as seen in FIG. 10); and a second horizontal axis 458, orthogonal to axis 454 and axis 456 (as seen in FIG. 10). During a squat exercise, lift arms 450 pivot about axis 454 against the user selected resistance applied by resistance source 430. During the squat exercise, lift arms 450 may pivot about axis 456 to provide limited or controlled sideways freedom of motion. During the squat exercise, lift arms 450 may additionally pivot or twist about axis 458, providing limited or controlled freedom of motion about axis 458 such as where the height of the lifter shoulders may be temporarily different during the squat exercise. Because lift arms 450 are pivotable about three orthogonal axes, squat exercise apparatus 420 provides enhanced freedom of motion for improved feel for the lifter.

Figure 11:
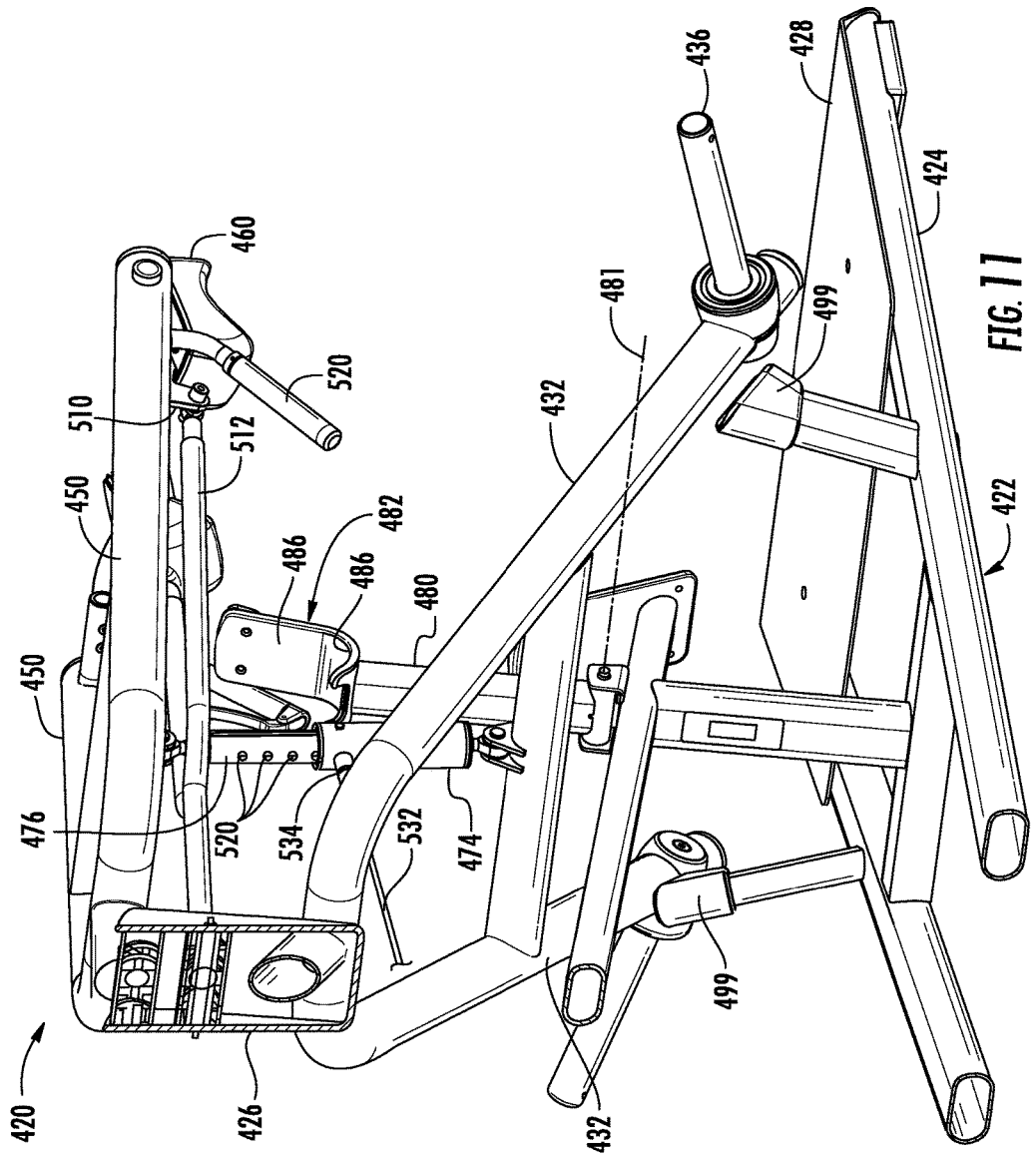
FIG. 11 is a front perspective view of the squat exercise apparatus of FIG. 9 with portions shown in section.

As shown by FIG. 11, post 452 and lift arms 450 are operably coupled to support structure 422 by at least one bearing assembly 500. The bearing assembly facilitates pivotal movement of post 452 and lift arms 450 about each of axes 454, 456 and 458. As further shown by FIG. 11, post 434 and weight movement arms 432 are similarly operably coupled to support structure 422 by bearing assembly 502 which facilitates pivotal movement of weight movement arms 432 about three orthogonal axes, namely, vertical axis 456, horizontal axis 504 extending parallel to axis 454, and horizontal axis 508 extending parallel to axis 458. In some implementations, weight movement arms 432 may alternatively pivot about a vertical axis that is parallel to axis 456, but which is forwardly or rearwardly offset from axis 456. Because lift arms 450 and weight movement arms 432 are both pivotal about three orthogonal axes, such pivoting movement of arms 450 and arms 432 occurs in substantial unison. In other implementations, weight movement arms 432 are pivotably coupled to tower 426 of support structure 422 for pivotal movement about a single horizontal axis, axis 504. In such an implementation, lift coupler 470 if pivotable relative to wait movement arms 432 and/or lift arms 450 about the three orthogonal axes that coincide with or are parallel with the three orthogonal axes about which lift arms 450 pivot.

Although apparatus 420 is illustrated as utilizing spherical bearing assembly 500 and 502, in other implementations, apparatus 420 may utilize other pivoting support mechanisms. For example, in other implementations, lift arms 450 and weight movement arms 432 may be operably coupled to support structure 422 by at least one universal joint, providing pivoting motion about three orthogonal axes. In yet other implementations, lift arms 450 and weight movement arms 432 may be operably coupled to support structure 422 by multiple interconnected bearings or pivotal connections that provide joints that collectively provide pivotal movement about each of the three orthogonal axes.

Shoulder pads 460 comprise pads to contact upper surfaces of a person's shoulders during a squat exercise. In the example illustrated, shoulder pads 460 each have a downward facing concave recess or channel 463 to receive a lifter's shoulders. In other implementations, shoulder pads 460 have downwardly facing flat surfaces. In the example illustrated, the downwardly facing surfaces 463 of shoulder pads 460 are soft or resiliently compressible. For example, in one implementation, such downwardly facing surfaces 463 are backed by foam or other resiliently compressible material. In other implementations, shoulder pads 460 are not compressible.

Shoulder pads 460 are each pivotally coupled to and supported by lift arms 450. In the example illustrated, shoulder pads 460 are each pivotable about a horizontal axis 464. As a result, shoulder pads 460 may be angularly oriented or repositioned to accommodate individual characteristics of a lifter.

Shoulder pad adjuster 462 comprises a mechanism that automatically adjusts or changes the angular orientation of each of shoulder pads 460, with respect to axis 464, in response to pivoting of lift arms 450 about axis 454. In other words, during pivotal movement of lift arms 450, shoulder pad adjuster 462 automatically reorients shoulder pads 460 to achieve a desired angular orientation of shoulder pads 460 despite such movement of lift arms 450. In the example illustrated, shoulder pad adjuster 462 maintains shoulder pads 460 at a predetermined angular orientation relative to tower 426 of support structure 422 despite pivoting of support arms 450. In the example illustrated, shoulder pad adjuster 462 comprises shoulder pad brackets 510 and linkage 512. The shoulder pad adjuster 462 allows for movement about 3 axes.

Shoulder pad brackets 510 pivotably support their respective shoulder pads 460 relative to axis 464. In the example illustrated, shoulder pad brackets 510 support and carry respective handgrips 520. Handgrips 520 comprise cylindrical rods are bars that are sized and shaped to be manually grasped by a person engaged in the squat exercise. Because handgrips 520 are carried by shoulder pad brackets 510, handgrips 520, like shoulder pads 460, pivot about axis 464. In particular, shoulder pad adjuster 462 automatically pivots handgrips 520 about axis 464 in response to pivotal movement of lift arms 450. As a result, handgrips 520 are maintained in a predetermined angular orientation relative to tower 426. The angular relationship between handgrips 520 and lift arms 450 automatically changes depending upon the particular angular orientation of lift arms 450 relative to tower 426. In other implementations, handgrips 520 are directly connected to and carried by lift arms 450 so as to have a predetermined angular orientation with respect to lift arms 450 that does not change as lift arms 450 are raised and lowered.

Linkage 512 comprises an elongate member, a fork in the illustrated example, having first ends which are pivotably secured to shoulder pad brackets 510 at a location spaced from axis 464 and a second end pivotably secured to tower 426 at a location spaced from axis 454. Support arms 450/post 452, shoulder pad brackets 510, linkage 512 and the upper portion of tower 426 extending between linkage 512 and post 452 cooperate to form a four-bar-linkage that maintains shoulder pads 460 at a predetermined angular orientation relative to tower 426. As the person engaged in a squat exercise bends his or her knees or extends his or her knees to raise and lower support arms 450, shoulder pad adjuster 462 automatically pivots shoulder pads 460.

Figure 11A:
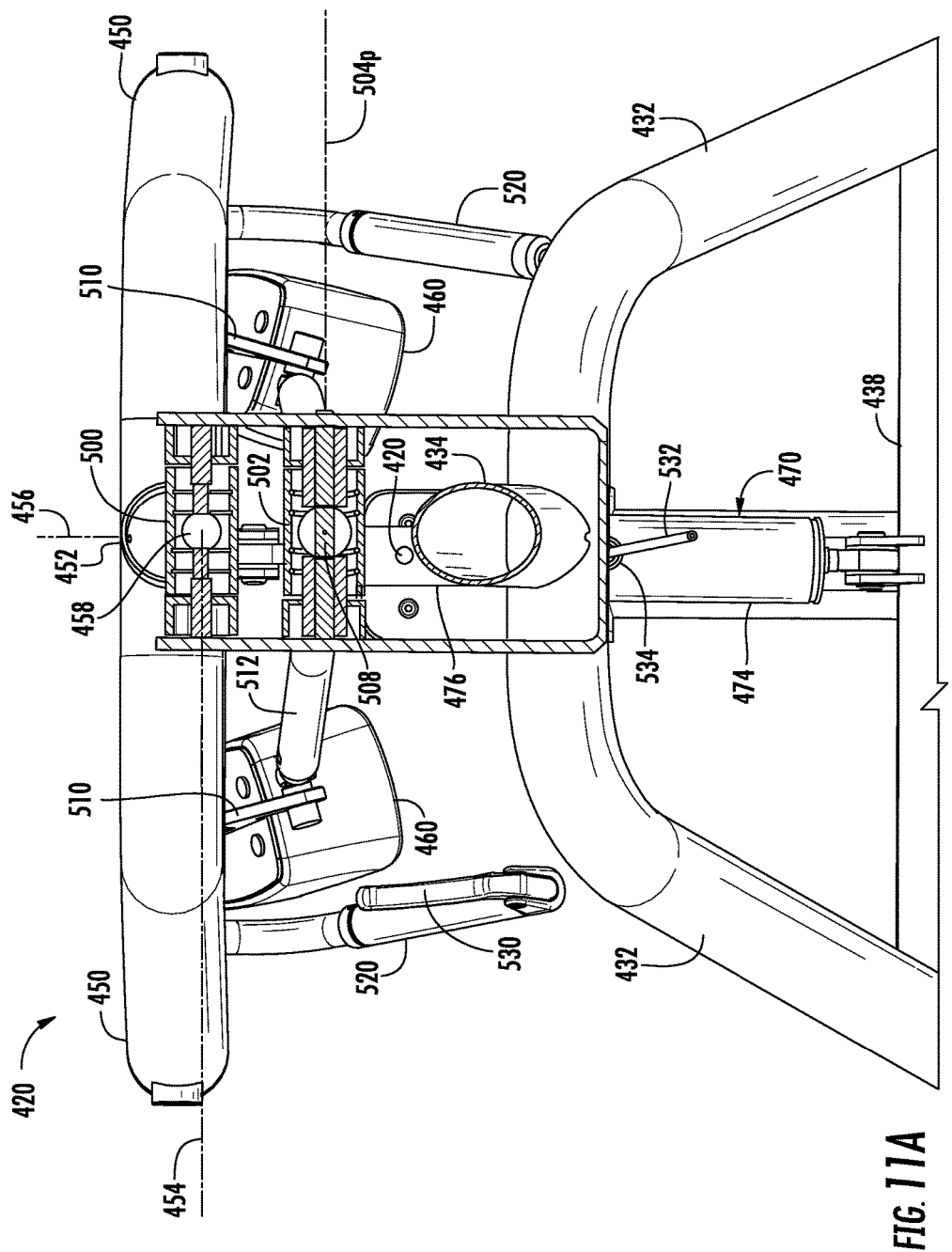
FIG. 11A is an enlarged front view of the squat exercise apparatus of FIG. 11 with the portion shown in section.

As shown by FIGS. 11 and 11A, post 452 and lift arms 450 are operably coupled to support structure 22 by at least one bearing assembly 500. The bearing assembly facilitates pivotal movement of post 452 and lift arms 450 about each of axes 454, 456 and 458. As further shown by FIGS. 11 and 11A, linkage 512 is similarly operably coupled to support structure 422 by bearing assembly 502 which facilitates pivotal movement of linkage 512 about three orthogonal axes, namely, vertical axis 456, horizontal axis 504, extending parallel to axis 454, and horizontal axis 508, extending parallel to axis 458. In some implementations, weight movement arms 432 may alternatively pivot about a vertical axis that is parallel to axis 456, but which is forwardly or rearwardly offset from axis 456. Because lift arms 450 and linkage 512 are both pivotal about three orthogonal axes, such pivoting movement of arms 450 and linkage 512 occurs in substantial unison.

Although apparatus 420 is illustrated as utilizing bearing assembly 500 and 502, in other implementations, apparatus 420 may utilize other pivoting support mechanisms. For example, in other implementations, lift arms 450 and linkage 512 may be operably coupled to support structure 422 by at least one universal joint or multi-axis gimbal, providing pivoting motion about three orthogonal axes, or at least one spherical bearing. In yet other implementations, lift arms 450 and linkage 512 may be operably coupled to support structure 422 by multiple interconnected bearings or pivotal connections that provide joints that collectively provide pivotal movement about each of the three orthogonal axes.

Lift coupler 470 is similar to lift coupler 270 described above. Lift coupler 470 operably couples weight movement arms 432 to lift arms 450 such that weight movement arms 432 are raised and lowered in response to movement of lift arms 450 through the application of force applied to lift anus 450. In the example illustrated, lift coupler 470 is also pivotably coupled to crossbar 478 and arms 450 by a universal joint, multi-axis, three axis bearing, three axis gimbal or spherical bearing assembly. In yet other implementations, lift coupler 470 is additionally or alternatively pivotally coupled to crossbar 438 by a universal joint, multi-axis, three axis bearing, three axis gimbal or spherical bearing assembly.

Figure 11B:
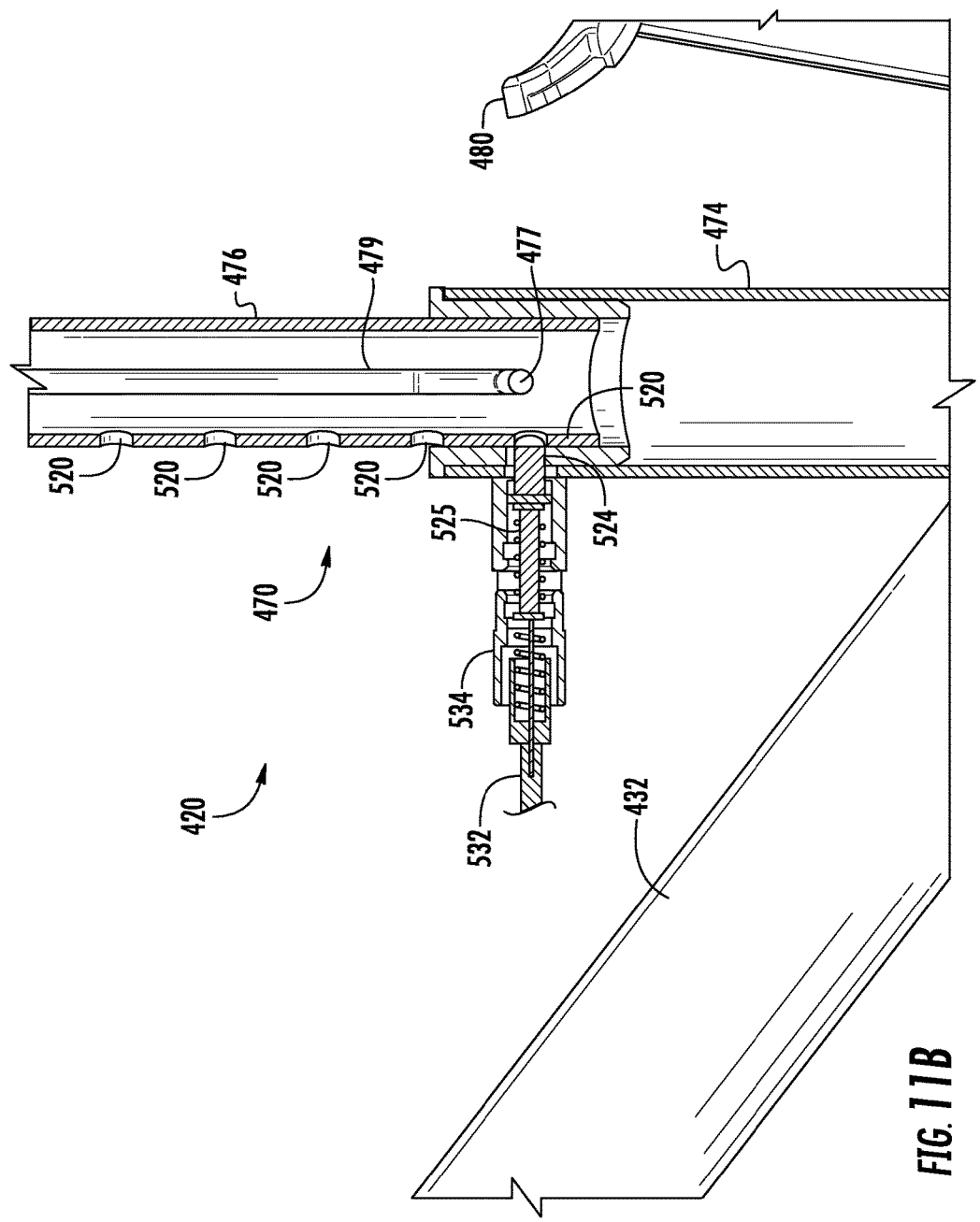
FIG. 11B is a fragmentary sectional view of the squat exercise apparatus of FIG. 9.
Figure 12:
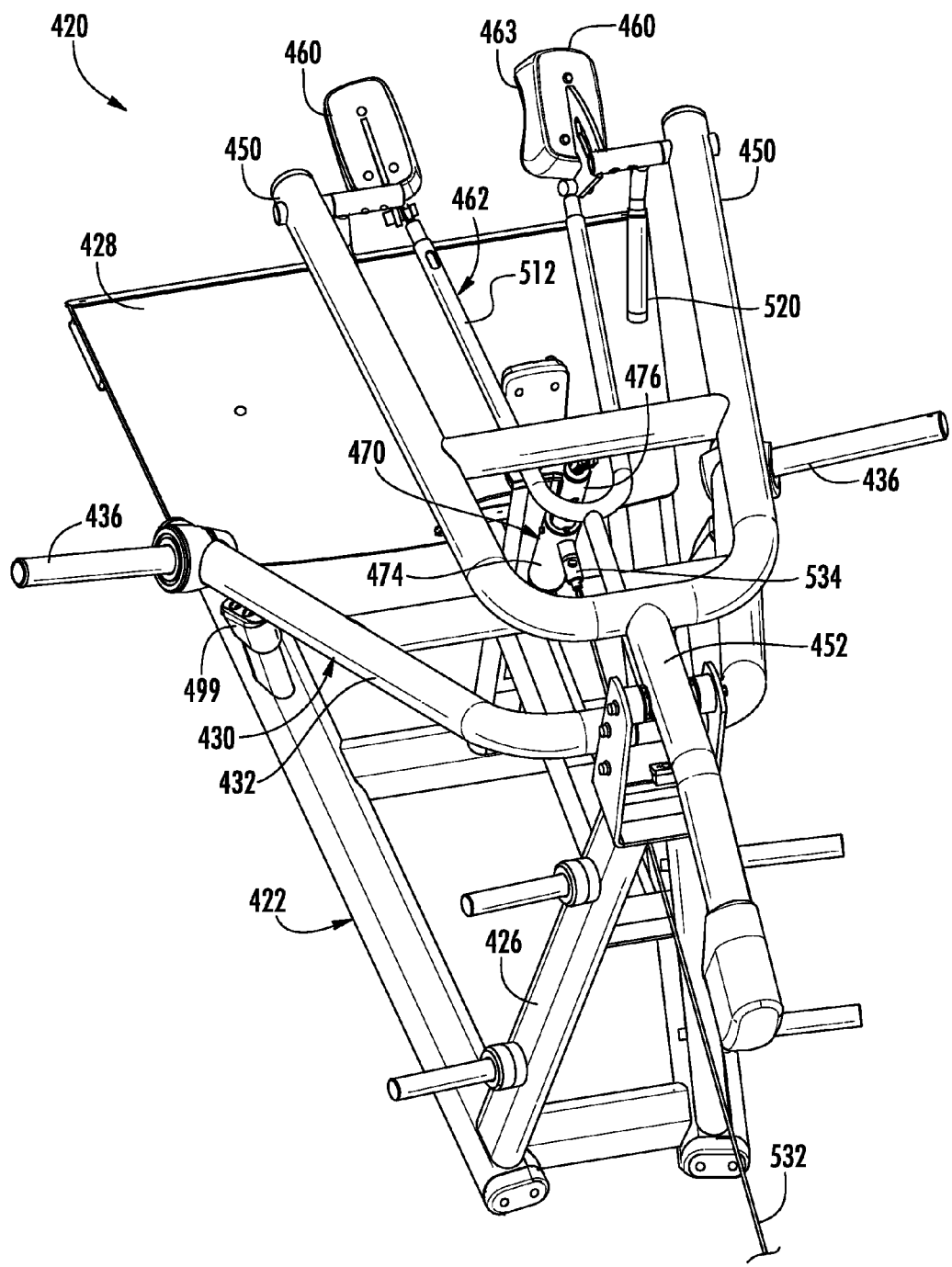
FIG. 12 is a front top perspective view of the squat exercise apparatus of FIG. 9.
Figure 13:
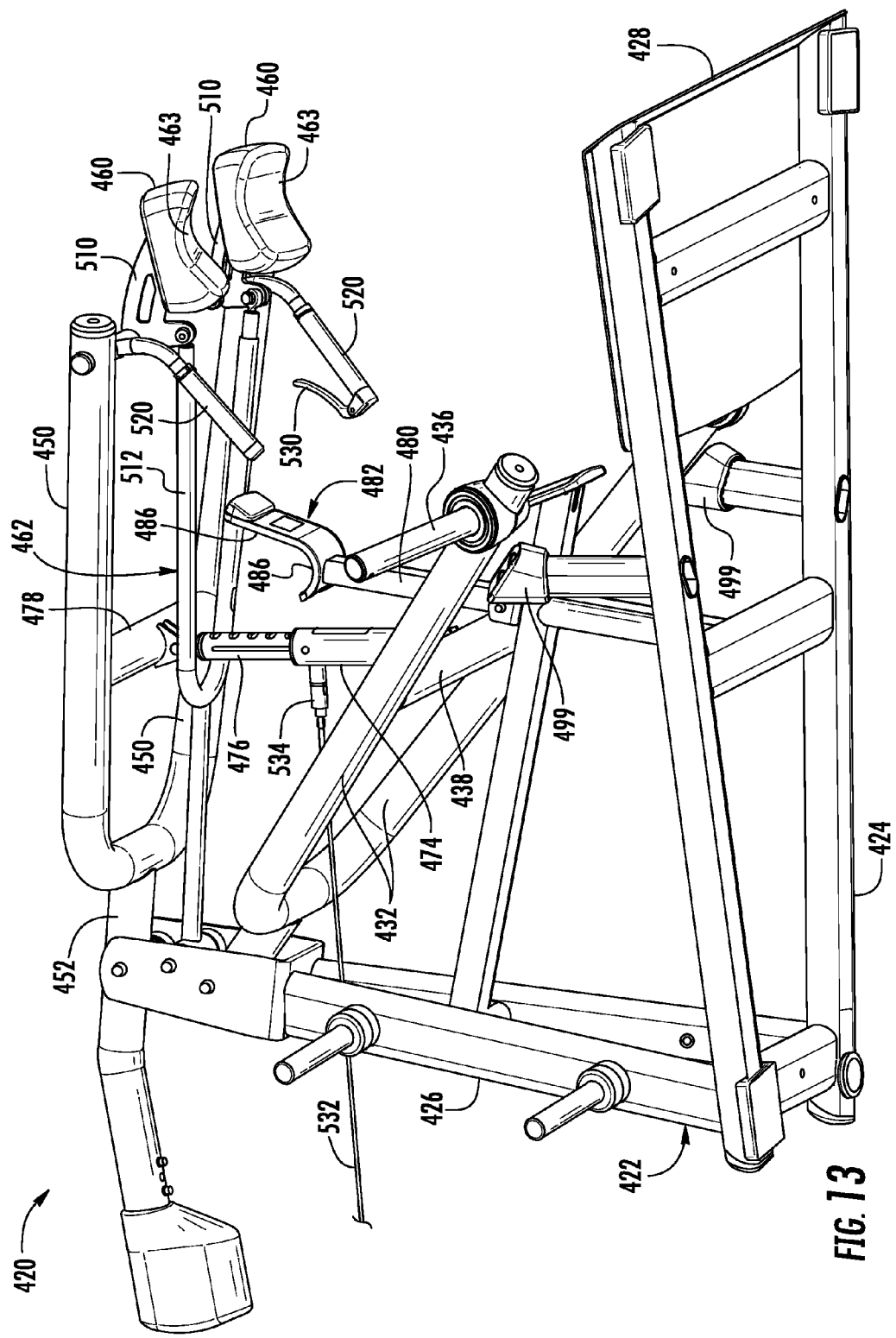
FIG. 13 is a bottom side perspective view of the squat exercise apparatus of FIG. 9.

As with lift coupler 270 described above, lift coupler 470 has an adjustable length. In the example illustrated, lift coupler 470 comprises a plurality of portions which telescopically extend relative to one another. In the example illustrated, lift coupler 470 comprises a lower linkage 474, an upper linkage 476 and a retaining mechanism 477. As shown by FIG. 11B, telescopic movement of linkages 474, 476 is facilitated by a projection or pin 477 extending from linkage 474 and slidably received within a guide slot or channel 479 axially extending along linkage 476.

Lower linkage 474 comprises a sleeve that is pivotably coupled to weight movement arms 432 by cross bar 438. In one implementation, lower linkage 474 is pivotable relative to cross bar 438 about three orthogonal axes which are parallel to the three orthogonal axes about which weight movement arms 432 pivot. Upper linkage 476 is telescopically received within lower linkage 474 and has an end portion pivotally coupled to lift arms 450 by an intermediate cross bar 478. In one implementation, upper linkage 478 is pivotable relative to cross bar 478 about three orthogonal axes which are parallel to the three orthogonal axes about which lift arms 450 pivot.

Retainer mechanism 477 comprises a mechanism that releasably retains lower linkage 474 and upper linkage 476 at a selected one of a plurality of different available relative positions corresponding to different available links of lift coupler 470. In the example illustrated, retainer mechanism 477 comprises a series of spaced detents 520, such as a series of spaced apertures, along one of linkages 474, 476 and an aperture 522 in the other of linkages 474, 476 through which or in which a retaining projection or pin 524 is received and is selectively positionable within one of the series of spaced detents 520. In other implementations, detents 520 may comprise a series of apertures or teeth along linkage 476, wherein linkage 474 carries a pivotable or slidable hook or catch which is selectively positionable within one of the teeth or apertures. As illustrated by FIG. 11B, a sectional view through lift coupler 470 and load limiter 534, in one implementation, the pin 524 (or the hook or catch) is resiliently biased by a spring 525 through lower linkage 474 towards an engaged position in which the pin 524 (hook or catch) is received within a selected one of the detents 520 in upper linkage 476. In other implementations, this relationship may be reversed, wherein linkage 474 is telescopically received within linkage 476 and wherein pin 524 is resiliently through linkage 476 into one of a series of axially spaced detents 520 provided along linkage 474.

The adjustable length of lift coupler 470 advantageously facilitates movement of lift arms 450 relative to weight movement arm 432 without movement of weight movement arm 432. As a result, lift arms 450 may be adjusted to a desired starting height at the beginning of a squat exercise. Such adjustment defines a range during initial setup. In other implementations, lift coupler 470 may have other forms for providing an adjustable length.

Lift coupler actuator 472 comprises a mechanism that facilitates adjustment of the length of lift coupler 470. Actuator 472 is supported by one of lift arms 450 proximate to one of handgrips 520, wherein actuator 472 is operably coupled to the pin, hook or catch 524 of lift coupler 470 to facilitate length adjustment of lift coupler 470. In the example illustrated, actuator 472 comprises manual adjustment lever 530, Bowden cable 532 and load limiter 534. Manual adjustment lever 530 comprises a lever pivotally supported along one of handgrips 520. Manual adjustment member 530 is pivotally connected to Bowden cable 532 which is connected to the projection, hook or pin 524 via load limiter 534. Bowden cable 532 comprises a cable slidable within an outer sheath. Although depicted as being substantially exposed for purposes of illustration, in the example illustrated, much of cable 532 extends within hollow interiors of the structures of apparatus 424 concealment. For example, in one application, cable 532 extends within hollow interiors of handgrips 520, and link 512 or lift arms 450.

Load limiter 534 transmits force from cable 532 to the hook, catch, projection or pin 524. Load limiter 534 protects cable 532 and manual adjustment lever 530 by limiting the extent of force applied to the pin, hook or catch 524 through cable 532. In some implementations, load limiter 534 is omitted, wherein cable 522 is directly connected to the resiliently biased pin, hook or catch 524. In one implementation, load limiter 534 includes spring 525, spring 526 and piston 527. Spring 525 can be configured with a lower spring constant than spring 526, such that when manual adjustment lever 530 is actuated by the user, piston 527 moves to compress spring 526. When spring 526 is compressed, pin or catch 524 is free to move enabling repositioning lift coupler 470.

In operation, to adjust a length of lift coupler 470, a person engaged in or about to engage in a squat exercise squeezes manual adjustment lever 530 to pull the cable within the sheath of Bowden cable 532 so as to retract the pin, hook or projection 524 against its resilient bias and out of engagement with one of detents 520. Once the pin, hook or catch has been disengaged, and while the person exercise continues to squeeze lever 530, the person exercising may raise or lower lift arms 450 to adjust a length of lift coupler 470. Once a desired length of lift coupler 470 and a desired starting position of shoulder pads 460 have been attained, and one of detents 520 has been aligned with the pin, hook or catch 524, the person exercising may release or terminate squeezing of manual adjustment lever 530. Upon release of manual adjustment lever 530, the pin, hook or catch 524 resiliently returns towards and into engagement with the aligned one of detents 522 to retain lift coupler 470 in the newly selected length. In other implementations, actuator 472 may comprise other mechanisms or have other configurations. Lift coupler 470 enables the lift arms 450 to be adjusted to the height, size or desired position of the user without requiring the user to also move or lift the weigh movement arm 432 during such adjustment. Lift coupler 470 provides a user with the ability to easily and readily adjust the apparatus 420 before initiating the exercise to the best position for that user thereby maximizing the user's experience and comfort while optimizing the efficiency and effectiveness of the exercise.

Weight movement arm support 480 is similar to weight movement arm support 380 described above. Weight movement arm support 480 comprises a structure or member pivotably coupled to support structure 422 about axis 481 so as to be movable or pivotable between a weight movement arm engaging position and a retracted position. For ease of explanation, weight movement arm support 480 is illustrated in a weight movement arm engaging position but with left arms 450 and weight movement arms 430 in the lowermost position in which weight movement arm 430 rest upon stops 499. In one implementation, withdrawal of crossbar 438 and disengagement of a weight movement arm 430 from weight movement arm support 480 results in weight movement arm support 480 pivoting, under the force of gravity, downward towards platform 428.

Weight movement arm support 480 comprises an armrest 482 having a floor surface 484 and an upstanding wall surface 486. Armrest 482 contacts and receives weight movement arm 432 to support weight movement arm 432 in initial starting position or when a squat exercise not being carried out. Upon pivoting of lift arms 450 and weight movement arm 432 during a squat exercise, weight movement arm 432 is moved out of engagement with armrest 482, allowing weight movement arm support 482 pivot downwards towards platform 428 to the disengaged or retracted state. Following such retraction, during the squat exercise, weight movement arms 432 may be lowered to a height below the arm supporting height of rest 482. As a result, lift arms 450 and weight movement arms 432 are supported at an intermediate height that is above a low end of the range of motion of lift arms 450 and arms 432, but that is below the upper end of the range of motion lift arms 450 and arms 432. Disengagement from arm support 480 is achieved by simple lifting of lift arms 450.

In the example illustrated, interacting portions of weight movement arm 432 and weight movement arm support 480 are magnetically attracted to one another. For example, in one implementation, portions of surface 484, surface 486 and/or corresponding surfaces (surfaces that come into contact with 484, 486) of crossbar 438 are magnetic. Such magnetic attraction assists in retaining weight movement arm 432 in engagement with rest 482 and further assist in retaining weight movement arm support 480 in the engaged state until weight movement arm 432 is lifted out of engagement with arm support 480. As the user lifts the weight movement arm 432, the forward, short lip of rest 482 slides along the back side of crossbar 438. This lifting movement takes the magnetic surfaces 484 and 486 of arm support 480 out of engagement with crossbar 438 until the user is finished his or her exercise and places the front, surface 486 of rest 482 to crossbar 438 such that magnetic surfaces 484 and/or 486 can catch the rear of crossbar 438.

In one implementation each of such surfaces is magnetic; portions of cross bar 438 of arms 432 having a first magnetic polarity and corresponding portions of arm support 480 having a second opposite magnetic polarity. In another implementation, portions of one of weight movement arms 432 and arm support 480 are magnetic while the corresponding portions of the other of weight movement arms 432 and arm support 480 are ferrous.

In the example illustrated, surfaces of crossbar 438 and surfaces 46 are magnetically attracted to one another. This magnetic attraction retains weight movement arm support 480 in the engaged state even when weight movement arm 432 is no longer resting upon surface 484 or upon (on top of) rest 482. As a result, weight movement arm support 480 is magnetically mechanically retained by rest 482 in the engaged position or state during initial lifting of lift arms 450 and weight movement arm 432 to start a squat exercise, ready to capture weight movement arms 432 (cross bracket 438 of arms 432) despite separation from floor surface 484. Conversely, when a lifter is finishing a squat exercise and has manually pivoted weight movement arm support 480 to the engaged position, upright wall portion or surface 486 is magnetically held against crossbar 438 of weight movement arm 432 as lift arms 450 and weight movement arms 432 are in the progress of being lowered towards and onto floor surface 484 of support 480. Such magnetic attraction allows a lifter to no longer hold support 480 as he or she lowers weight movement arms 432. Such magnetic attraction further assist in ensuring complete aligned reception of weight movement arms 432 by rest 482 of support 480.

Figure 14:
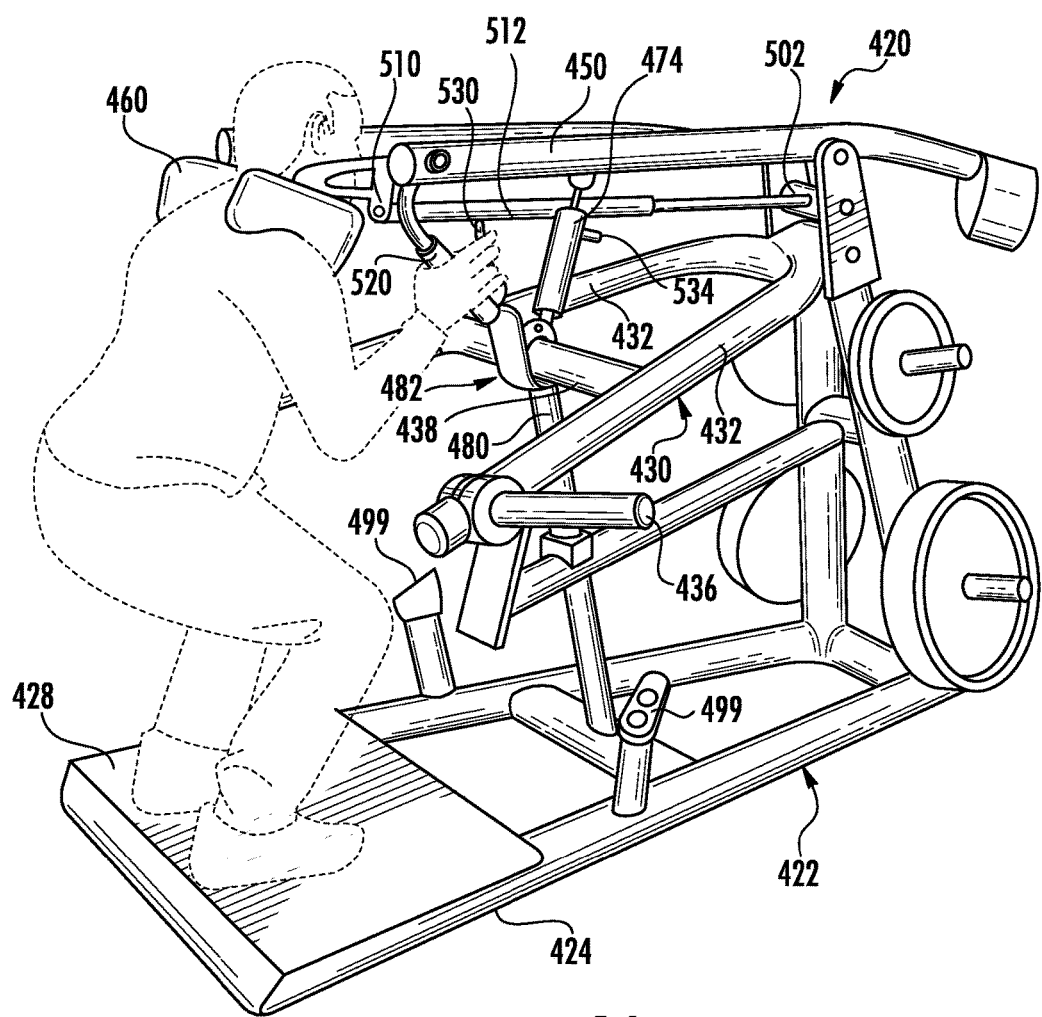
FIG. 14 is a rear perspective view of the squat exercise apparatus of FIG. 9 illustrating shoulders of user/person/lifter shoulders position beneath and in contact with shoulder pads while the lifter is grasping a manual adjustment lever.
Figure 15:
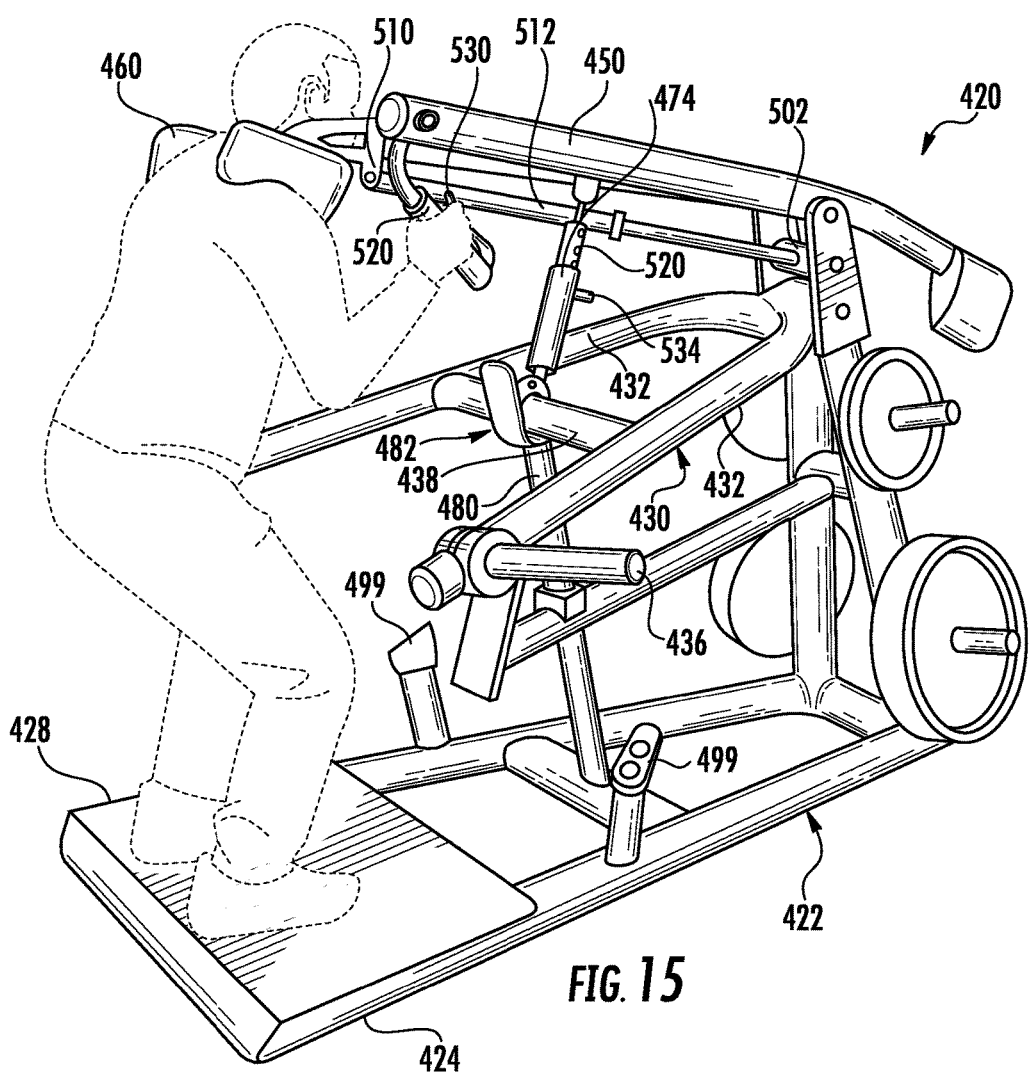
FIG. 15 is a rear perspective view of the squat exercise apparatus of FIG. 14 further illustrating the lifter squeezing the manual adjustment lever to initiate adjustment of a starting height of the shoulder pads while weight movement arms remains supported by a weight movement arm support.
Figure 16:
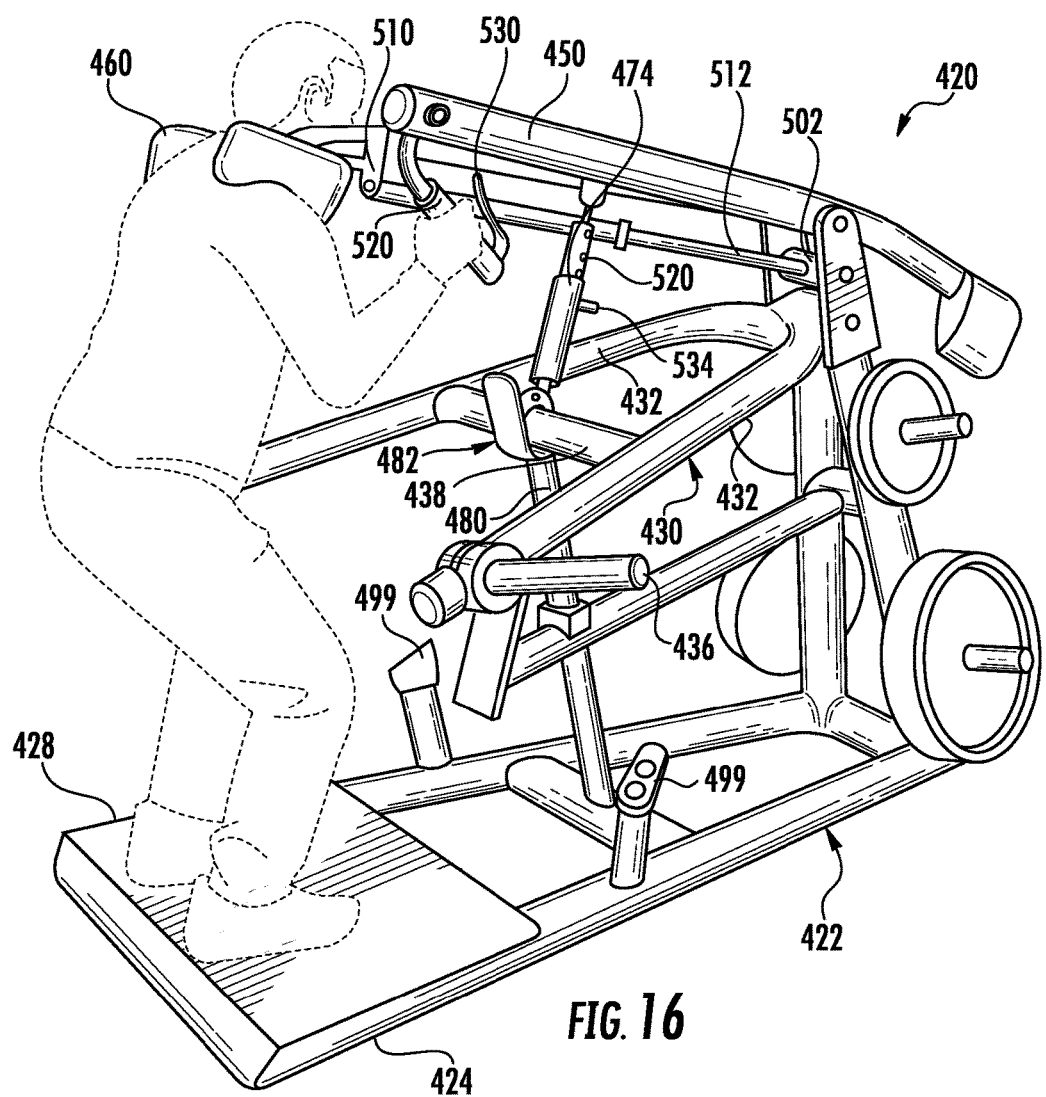
FIG. 16 is a rear perspective view of the squat exercise apparatus of FIG. 14 illustrating completion of the adjustment of the starting height of the shoulder pads.

FIGS. 14-27 illustrate various operational states of squat exercise apparatus 420. FIG. 14 illustrates the user/person/ lifter engaged with squat exercise apparatus 420 with his shoulders position beneath and in contact with shoulder pads 460. FIG. 14 further illustrates the user grasping manual adjustment lever 530 to initiate adjustment of the length of lift coupler 470 to adjust the starting height of shoulder pads 460 while weight movement arms 432 remains supported by weight movement arm support 480. FIG. 15 illustrates the user squeezing manual adjustment lever 530 which results in the cable 532 being pulled so as to withdraw the hook/catch/ pin 524 from its present detent 520, allowing linkage 476 to be telescopically extended with respect to linkage 474. FIG. 16 illustrates completion of the height adjustment. In particular, FIG. 16 illustrates exercise apparatus 420 after the user has lifted or raised shoulder pads 460 and lift arms 452 telescopically extend linkage 476 relative to linkage 474, whereupon at the desired height, the user releases manual adjustment lever 530. Release of manual adjustment lever 530 allows the resilient spring or bias to move the pork/pin/ catch 524 into engaged state with respect to an aligned one of detents 520. As a result, lift coupler 470 is at a different length with shoulder pads 460 at a different starting height above platform 428 shoulder pads 460.

Figure 17:
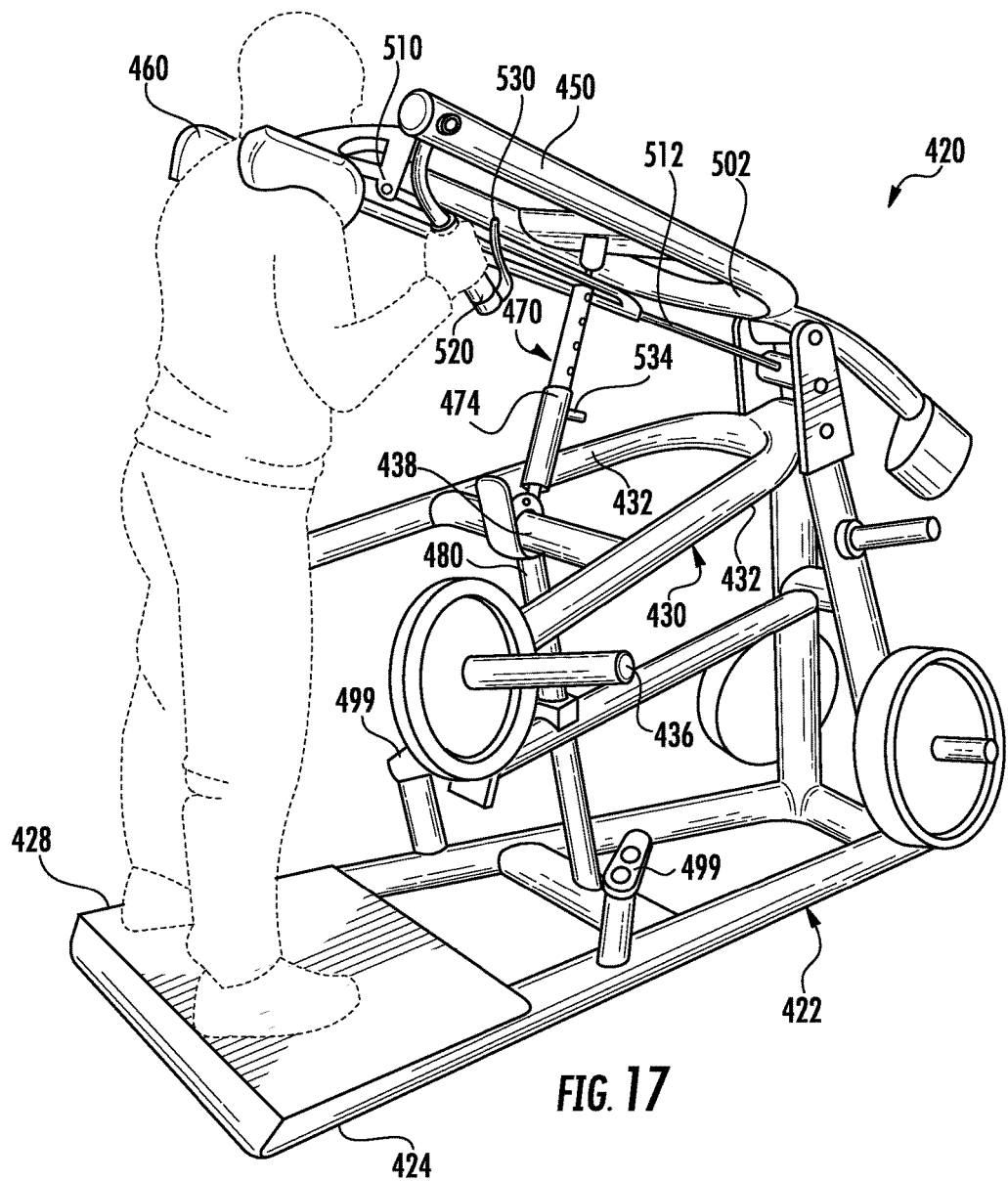
FIG. 17 is a rear perspective view of the squat exercise apparatus of FIG. 9 illustrating the lifter extending his or her knees and legs initiate the raising of lift arms and lift weight movement arms with the carried weight plates from an example rest.

FIG. 17 illustrates the user extending his or her knees and legs to exert force upon shoulder pads 460 so as to raise lift arms 450 and lift weight movement arms 430 with the carried weight plates. During such lifting, lift arms 450 and weight movement arms 430 pivot about axes 454 and 504, respectively. As lift arms 450 and weight movement arms 430 are lifted, crossbar 438, while being magnetically held against upright surface 486 of rest 482, slides vertically upward along and in contact with surface 486. Once crossbar 46 has been lifted to a height above surface 46, weight movement arm support 480 naturally pivots and falls under the force of gravity to a withdrawn state, allowing crossbar 438 to be lowered below the initial height at which crossbar 438 was supported by weight movement arm support 480. As a result, lift arms 450 and weight movement arms 430 and also be pivoted (raisin lowered) through a greater range of motion. The initiation of a squat exercise does not require the person exercising to manually disengage crossbar 438 as this automatically occurs in response to magnetic separation of crossbar 438 and rest 482 of support 480.

Figure 18:
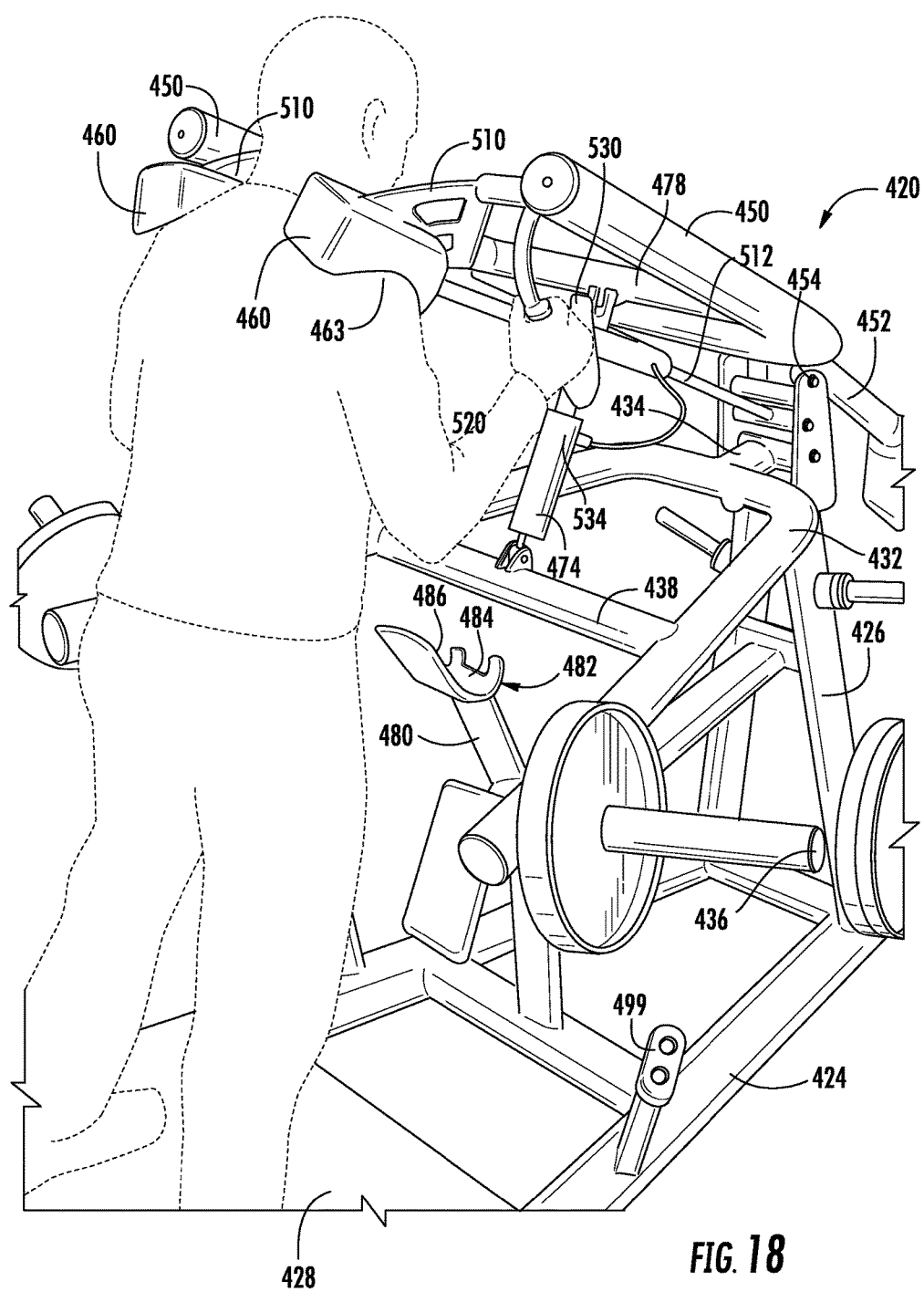
FIG. 18 is a rear perspective view of the squat exercise apparatus of FIG. 9 illustrating the lifter further extending his or her knees and legs to withdraw the weight movement arms with the carried weight plates from an example weight movement arm support and to pivot movement of the lift arms to the right.
Figure 19:
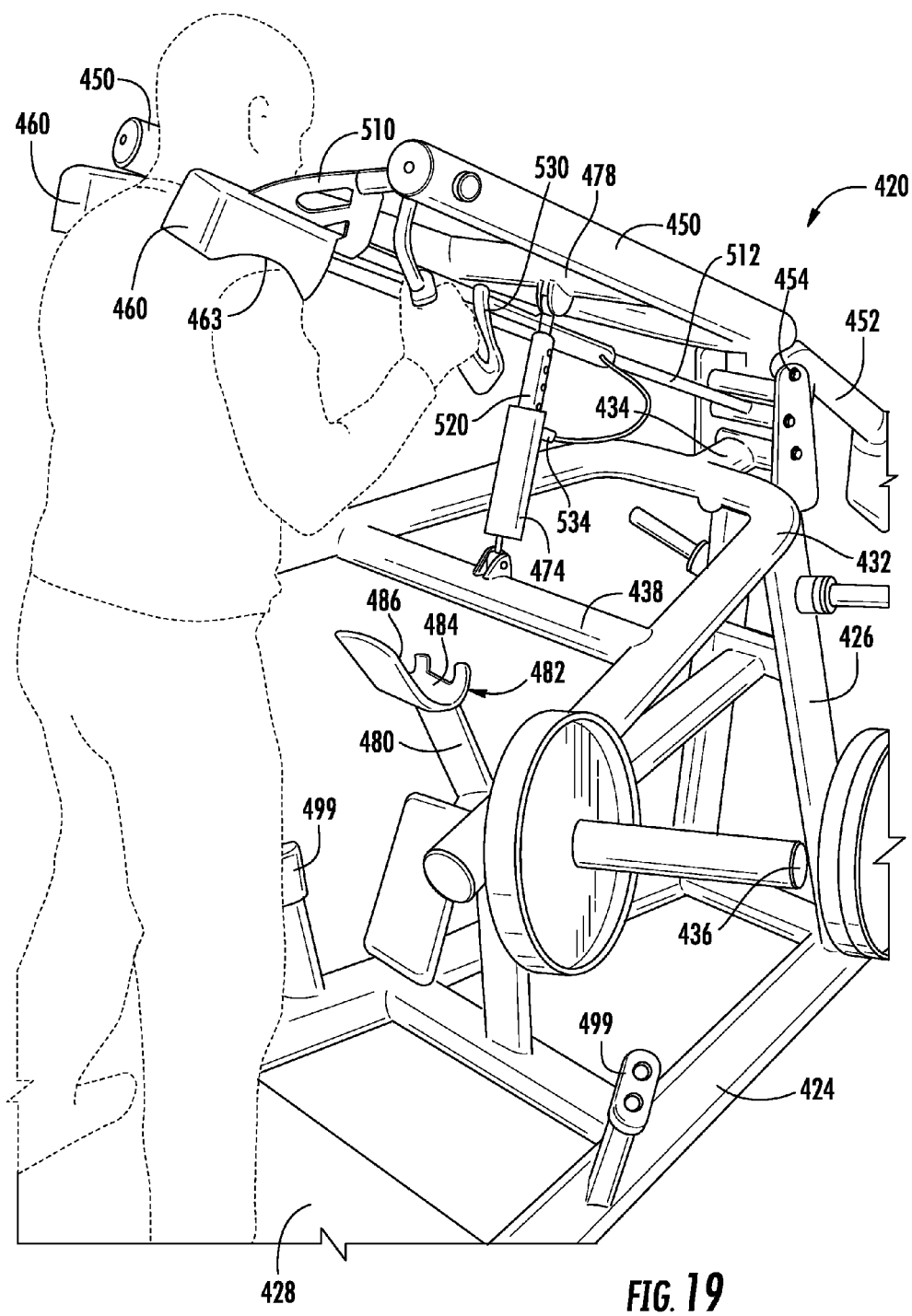
FIG. 19 is a rear perspective view of the squat exercise apparatus of FIG. 9 illustrating the lifter pivoting the lift arms to the left.

As discussed above, squat exercise apparatus 420 facilitates left and right sideways repositioning of lift arms 450 and shoulder pads 460. FIGS. 18 and 19 illustrate pivotal movement of lift arms 450 and weight movement arms 430 about axis 456. FIG. 18 illustrates pivotal movement of lift arms 450 by the user to the right. FIG. 19 illustrates pivotal movement of lift arms 450 by the user to the left.

Figure 20:
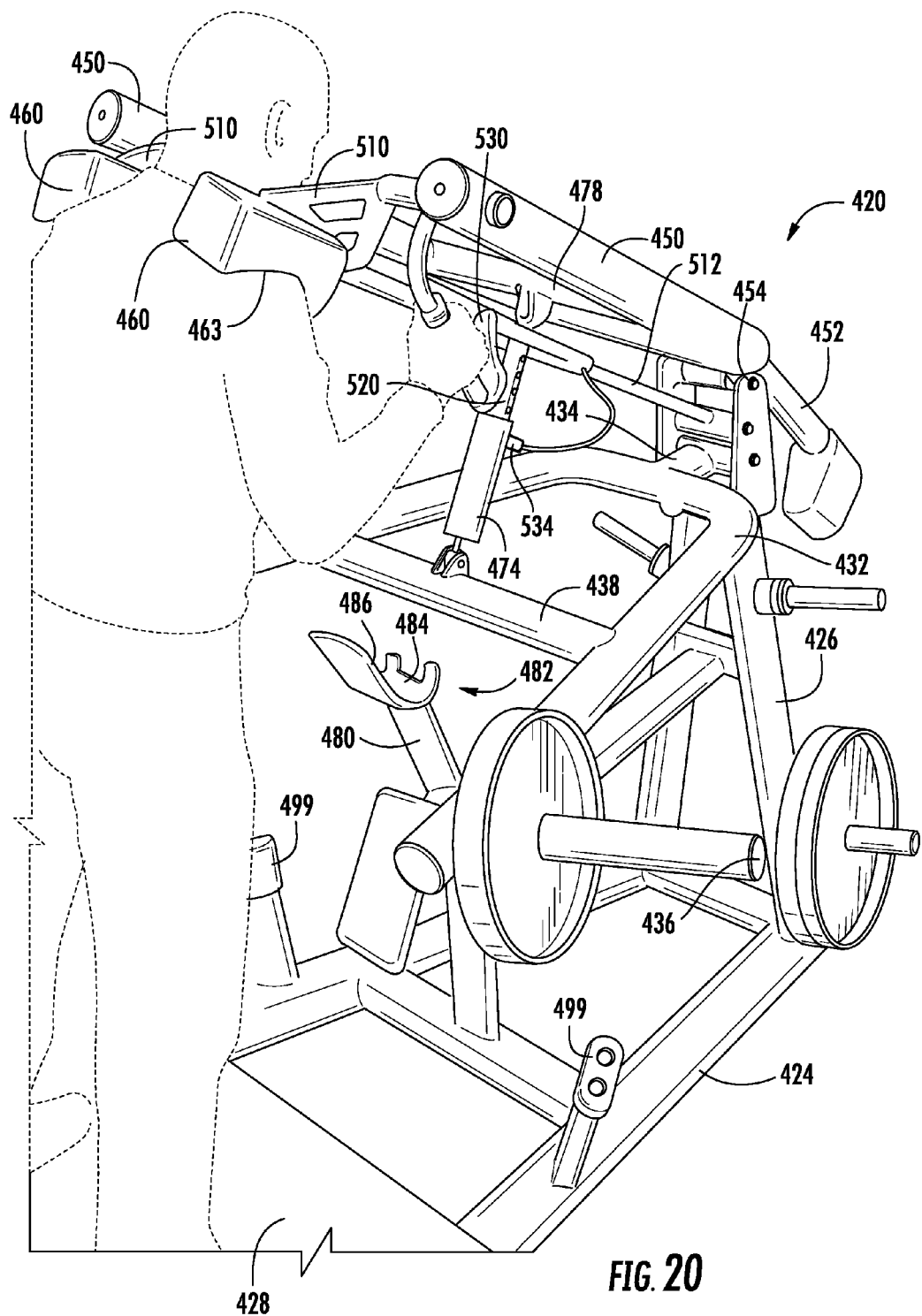
FIG. 20 is a rear perspective view of the squat exercise apparatus of FIG. 9 illustrating pivoting of the lift arms in a clockwise direction with the lifter's right shoulder at a height lower than the lifter's left shoulder.
Figure 21:
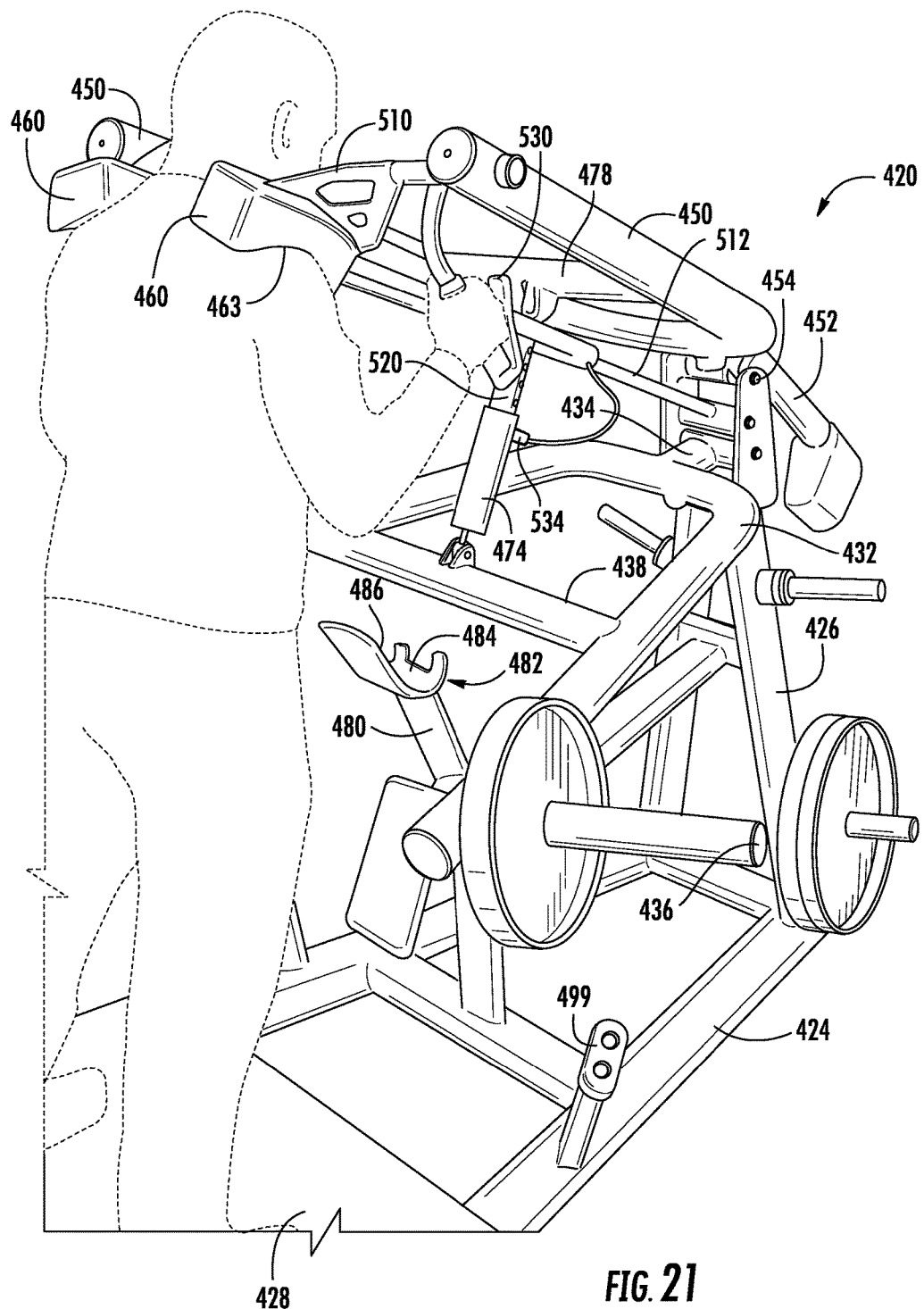
FIG. 21 is a rear perspective view of the squat exercise apparatus of FIG. 9 illustrating pivoting of the lift arms in a counter-clockwise direction with the lifter's right shoulder at a height higher than the lifter's left shoulder.

FIGS. 20 and 21 illustrate pivotal movement of lift arms 450 and weight movement arms 430 about axes 458 and 508, respectively. FIG. 20 illustrates the user's right shoulder at a height lower than the user's left shoulder such that lift arms 450 and weight movement arms 430 twist in a clockwise direction (as seen by the user when looking towards a front of exercise apparatus 420) about axes 458 and 508, respectively. FIG. 21 illustrates the user's left shoulder at a height lower than the user's right shoulder such that lift arms 450 and weight movement arms 430 twist in a counterclockwise direction (as seen by the user when looking towards a front of exercise apparatus 420) about axes 458 and 508, respectively. As noted above, exercise apparatus provide such pivoting about the three orthogonal axes through the use of bearing assemblies. In other implementations, other bearing arrangements may be used to provide for such pivotal movement capabilities.

Figure 22:
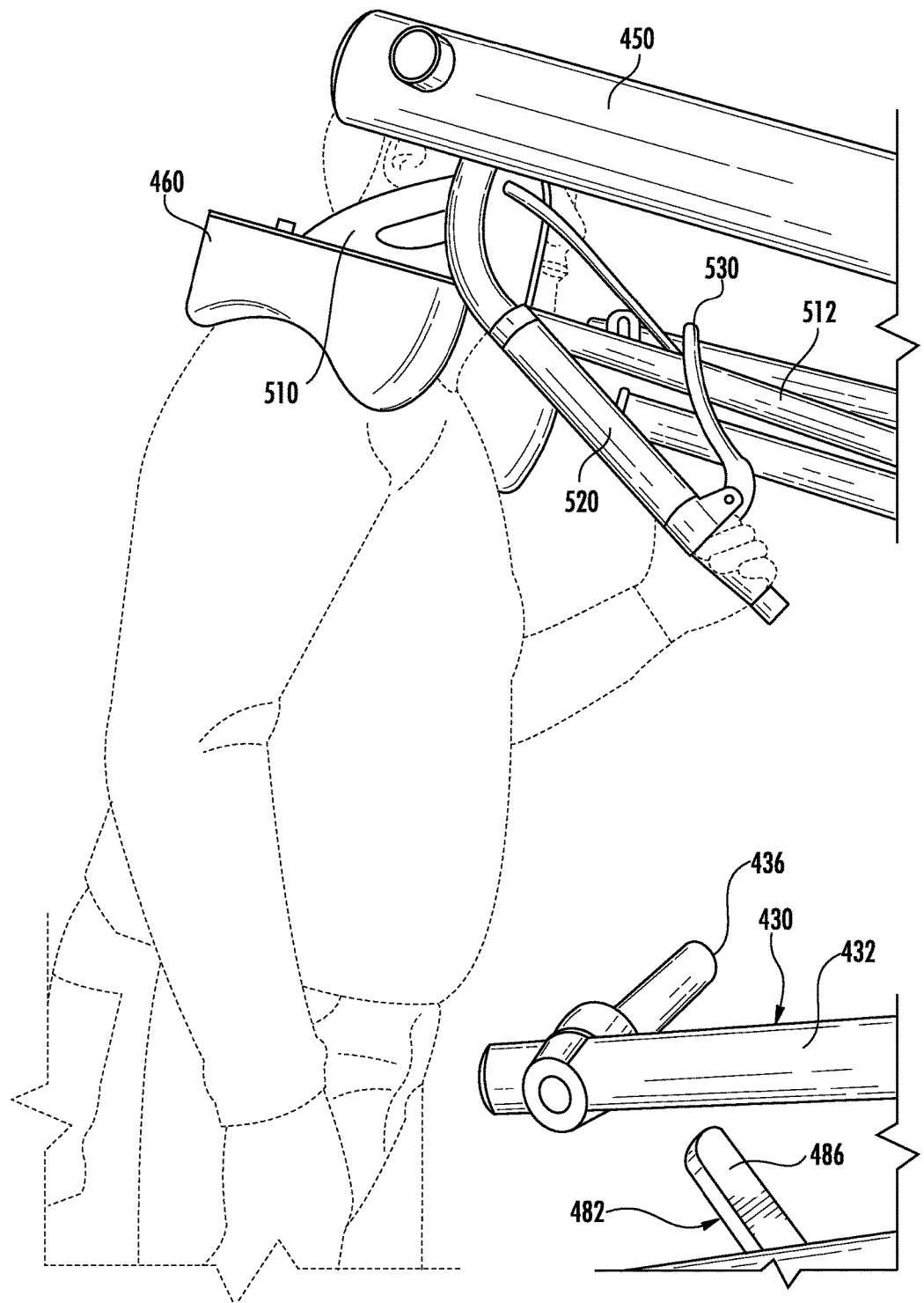
FIG. 22 is a side perspective view of the squat exercise apparatus of FIG. 9 illustrating an angular orientation of the shoulder pads when the lift arms have been lifted to a fully raised position.
Figure 23:
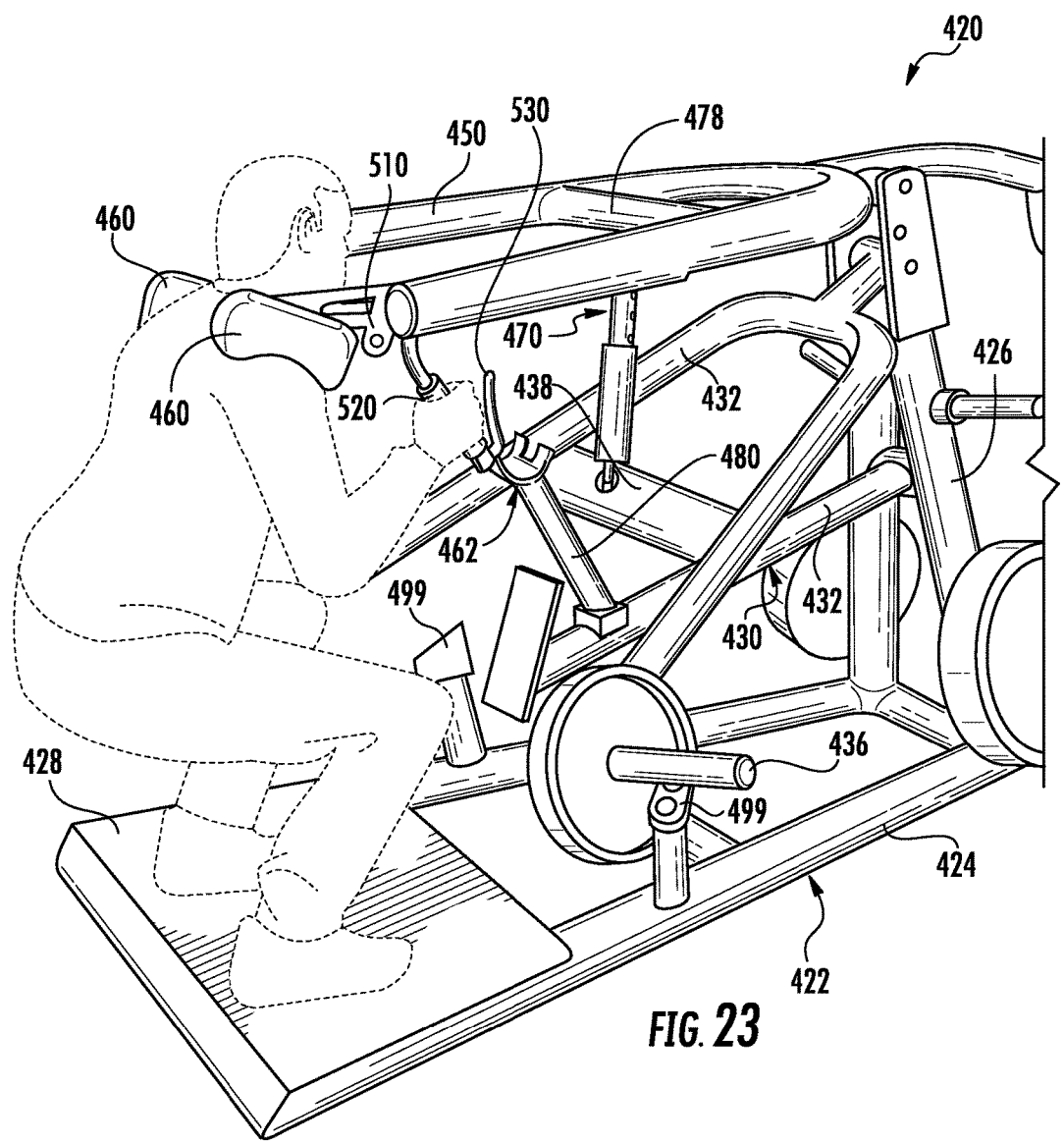
FIG. 23 is a rear perspective view of the squat exercise apparatus of 9 illustrating the angular orientation of the shoulder pads being maintained when the lift arms are being lowered.
Figure 24:
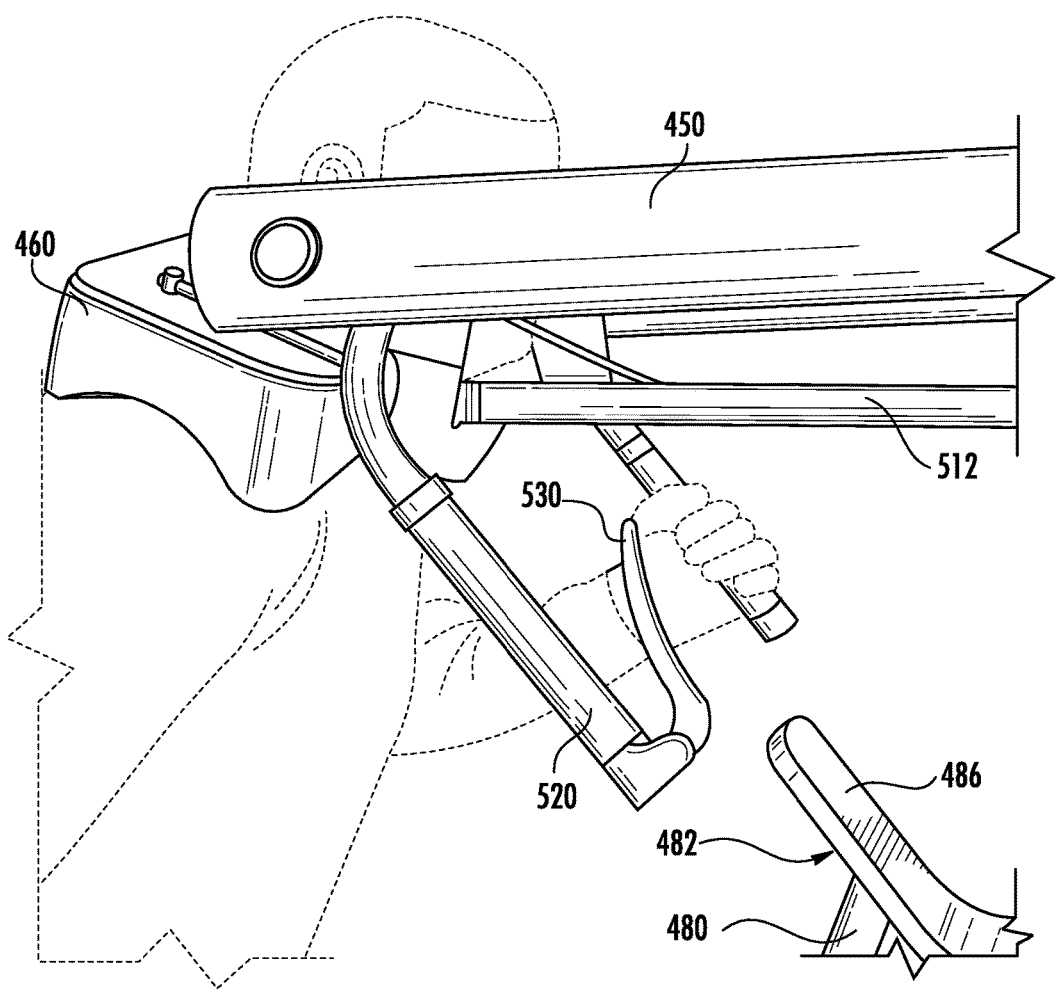
FIG. 24 is a side perspective view of the squat exercise apparatus of FIG. 9 illustrating the angular orientation of the shoulder pads being maintained when the lift arms in a fully lowered position.

FIG. 22 is a side view illustrating a first orientation of shoulder pads 460 when lift arms 450 have been lifted to a fully raised position. FIG. 23 illustrates the user squatting to a lowermost position such that lift arms 450 pivot about axis 454 to a lowered state. FIG. 24 is a side view illustrating a second orientation of shoulder pads 460 when lift arms 450 have been moved to the fully lowered position. During such movement, linkage 512, which is part of a four-bar linkage, maintains the angular orientation of shoulder pads 460 relative to tower 426 despite the angular repositioning of lift arms 450.

Figure 25:
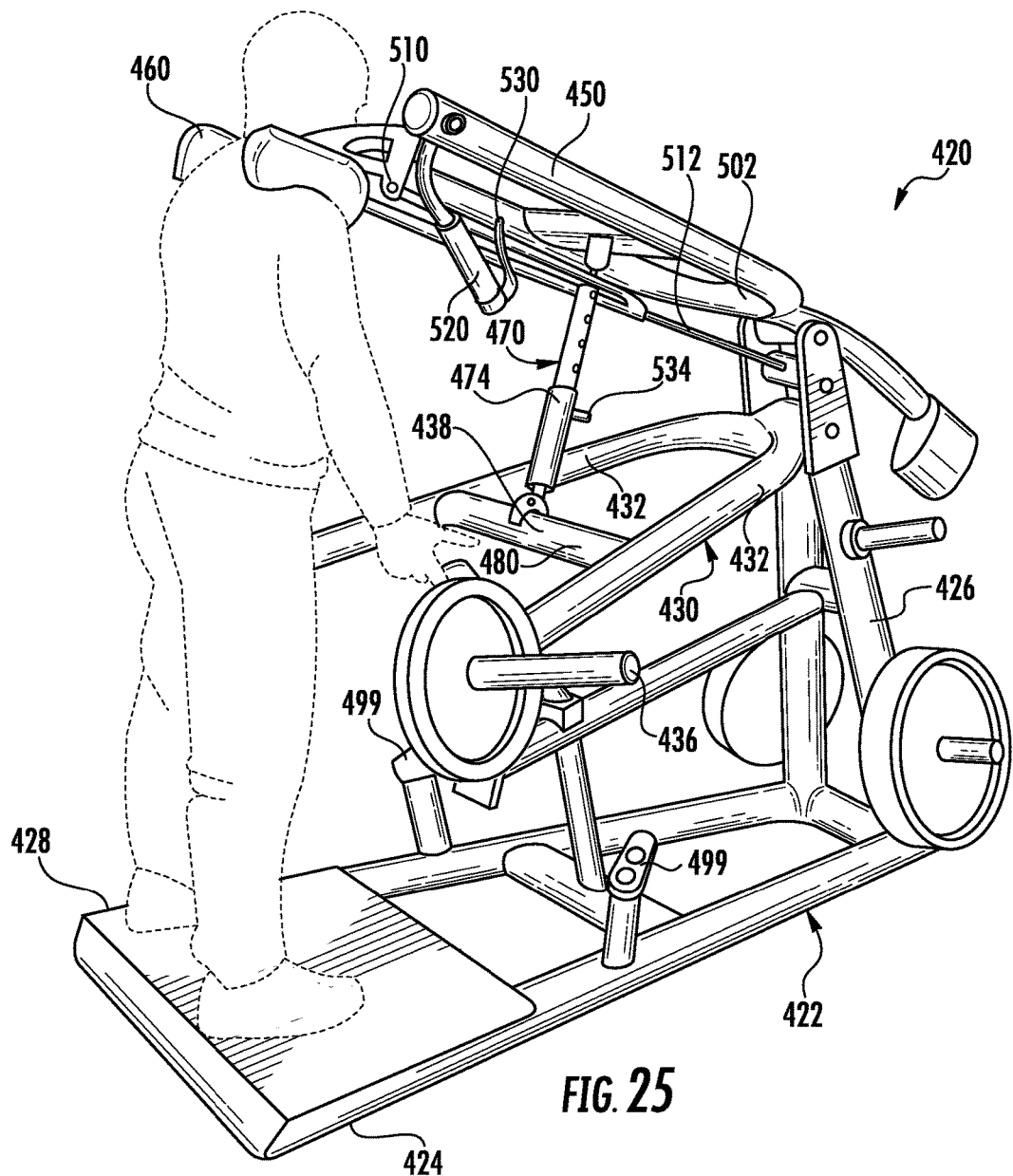
FIG. 25 is a rear perspective view of the squat exercise apparatus of FIG. 9 illustrating the lifter supporting the lift arms, weight movement arms, and the supported weight such that a crossbar of the lift arms is raised above the engaged height of weight movement arm support and with the left or making contact with weight movement arm support in preparation of moving weight movement arm support.
Figure 26:
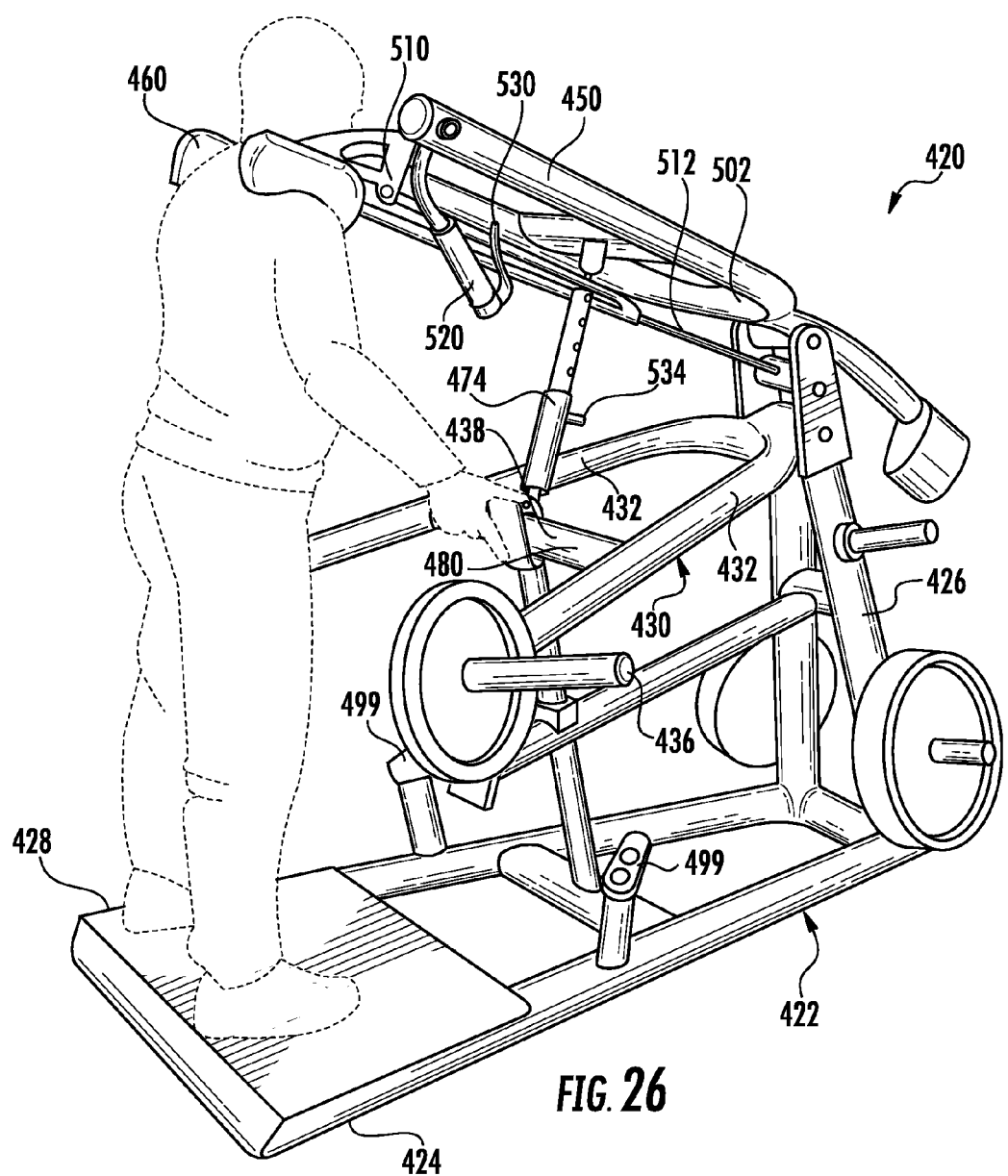
FIG. 26 is a rear perspective view of the squat exercise apparatus of FIG. 9 illustrating the lifter pivoting the weight movement arm from a withdrawn position to an engaged position.
Figure 27:
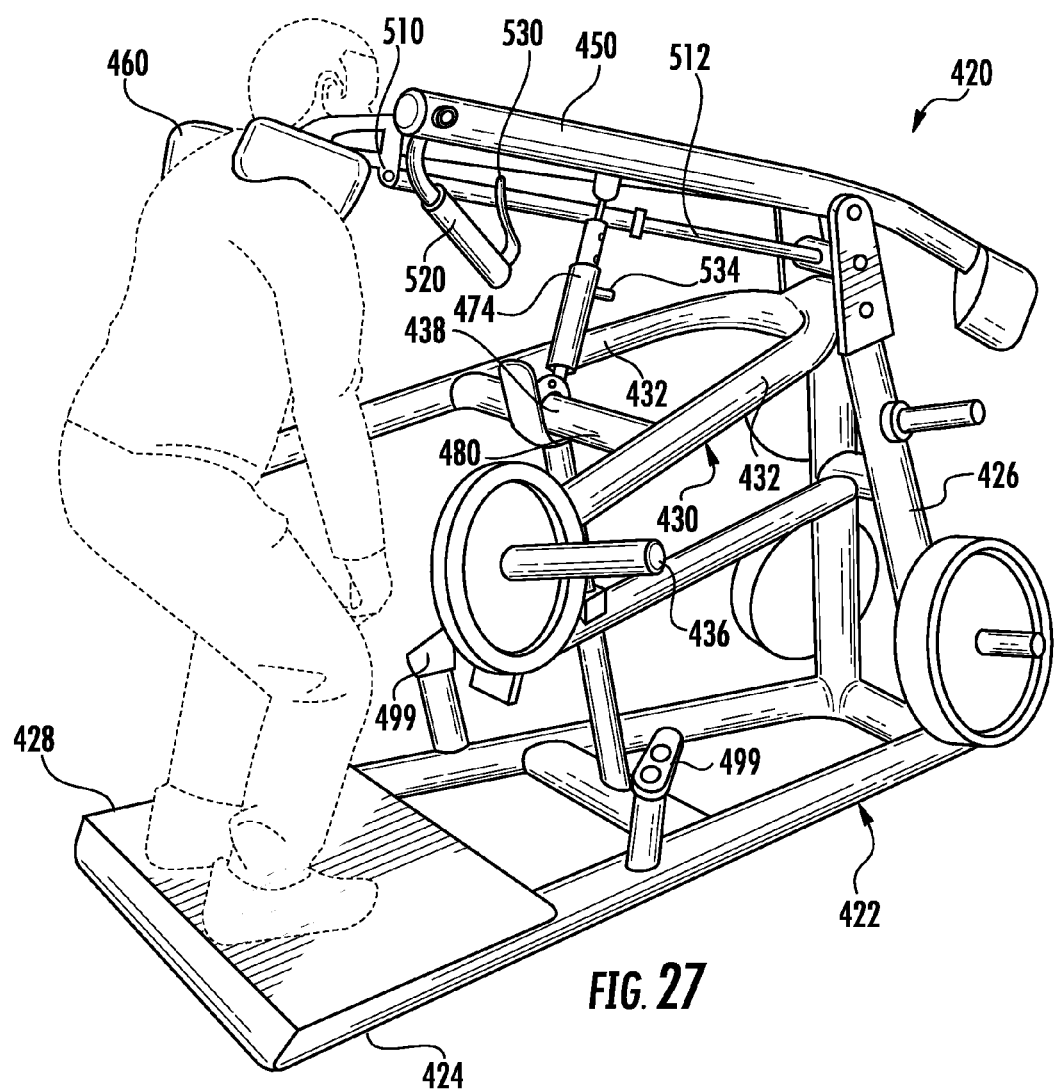
FIG. 27 is a rear perspective view of the squat exercise apparatus of FIG. 9 illustrating the lifter manually releasing the weight movement arm as he or she lowers the crossbar into contact with the weight movement arm support.

FIGS. 25-27 illustrate the user completing a squat exercise or squat exercise session and withdrawing from squat exercise apparatus 420. FIG. 25 illustrates the user supporting lift arms 450, weight movement arms 430 in the supported weight such that crossbar 438 is raised above the engaged height of weight movement arm support 480. FIG. 25 further illustrates the user making contact with weight movement arm support 480 in preparation of moving weight movement arm support 480.

FIG. 26 illustrates the user pivoting weight movement arm 480 from the withdrawn position to an engaged position. As shown by FIG. 26, in the engaged position, the upright wall portion 486 abuts a rear surface of crossbar 438 and is magnetically attracted to and held against crossbar 438 in the engaged position. As shown by FIG. 27, the magnetic attraction between upright wall surface 486 and crossbar 438 allows the user to manually release weight movement arm support 480 such that the user may grasp both of handgrips 520 as he or she lowers crossbar 438 into contact with floor 484 a weight movement arm support. During lowering, crossbar 438 slides along upright surface 486, while being magnetically held against surface 486, into the concave receiving configuration of floor 484. Once crossbar 438 and weight movement arms 430 are supported by weight movement arm support 480, the user may disengage from shoulder pads 460 and squat exercise apparatus 420.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A squat exercise apparatus comprising:
   a support structure;
   a user adjustable resistance source;
   lift arms supported by the support structure and operably coupled to the user adjustable resistance source; and
   shoulder pads carried by the lift arms and movably supported by a shoulder pad adjuster which forms part of a four-bar linkage with the lift arms such that the shoulder pads automatically pivot about a horizontal axis relative to the lift arms in response to pivoting of the lift arms relative to the support structure, wherein the four bar linkage comprises four links formed in part by the lift arms and the shoulder pad adjuster, the four links connected together such that the lift arms and shoulder pad adjuster pivot together vertically.

2. The squat exercise apparatus of claim 1 further comprising at least one shoulder pad linkage forming a portion of the four-bar linkage and coupling the shoulder pads to the support structure, the at least one shoulder pad linkage moving in response to pivoting of the lift arms relative to the support structure to pivot the shoulder pads relative to the lift arms.

3. The squat exercise apparatus of claim 1, wherein the lift arms form one of the links of the four bar linkage.

4. A squat exercise apparatus comprising:
   a support structure;
   a user adjustable resistance source;
   lift arms supported by the support structure and operably coupled to the user adjustable resistance source, the lift arms being pivotable relative to the support structure about three orthogonal axes; and
   handgrips, wherein the handgrips automatically pivot relative to the lift arms in response to pivoting of the lift arms relative to the support structure, wherein the handgrips are movably supported by a four-bar linkage such that the handgrips automatically pivot vertically relative to the lift arms in response to pivoting of the lift arms relative to the support structure.

5. The squat exercise apparatus of claim 4 further comprising shoulder pads carried by the lift arms and movably supported by the four-bar linkage such that the shoulder pads automatically pivot relative to the lift arms in response to pivoting of the lift arms relative to the support structure.

6. The squat exercise apparatus of claim 4, wherein the lift arms form one of the links of the four bar linkage.

7. A squat exercise apparatus comprising:
   a support structure;
   a user adjustable resistance source;
   lift arms supported by the support structure and operably coupled to the user adjustable resistance source, the lift arms being pivotable relative to the support structure about three orthogonal axes, wherein the user adjustable resistance source comprises at least one weight movement arm pivotably supported by the support structure and operably coupled to the lift arms to pivot in response to pivoting of the lift arms; and
   a weight movement arm support, the weight movement arm support pivotable between a weight movement arm engaging position and a retracted position, wherein interacting portions of the weight movement arm support and the weight movement arm are magnetically attracted to one another to magnetically retain the weight movement arm support in the weight movement arm engaging position.

8. The squat exercise apparatus of claim 7 further comprising lower weight movement arm stops.

9. A squat exercise apparatus comprising:
a support structure;
a user adjustable resistance source;
lift arms supported by the support structure and operably coupled to the user adjustable resistance source, the lift arms being pivotable relative to the support structure about three orthogonal axes, wherein the user adjustable resistance source comprises at least one weight movement arm pivotably supported by the support structure and operably coupled to the lift arms to pivot in response to pivoting of the lift arms;
at least one lift coupler coupling the least one weight movement arm to the lift arms, the at least one lift coupler having an adjustable length;
handgrips supported by the lift arms; and
an actuator supported by one of the lift arms proximate one of the handgrips, the actuator being operably coupled to the at least one lift coupler, the actuator being actuatable from a lift coupler length retaining state to a lift coupler length adjusting state by a hand of the user, while said one of the handgrips remains at least partially gripped by a palm of the hand, to adjust a length of the at least one lift coupler.

10. The squat exercise apparatus of claim 9 further comprising shoulder pads carried by the lift arms.

11. The squat exercise apparatus of claim 10, wherein the shoulder pads are pivotable relative to the lift arms.

12. The squat exercise apparatus of claim 11, wherein the shoulder pads automatically pivot in response to pivoting of the lift arms relative to the support structure.

13. The squat exercise apparatus of claim 12 further comprising at least one shoulder pad linkage coupling the shoulder pads to the support structure, the at least one shoulder pad linkage moving in response to pivoting of the lift arms relative to the support structure to pivot the shoulder pads.

14. The squat exercise apparatus of claim 9 further comprising a weight movement arm support, the weight movement arm support pivotable between a weight movement arm engaging position and a retracted position.

15. The squat exercise apparatus of claim 14, wherein interacting portions of the weight movement arm support and the weight movement arm are magnetically attracted to one another to magnetically retain the weight movement arm support in the weight movement arm engaging position.

16. The squat exercise apparatus of claim 15 further comprising lower weight movement arm stops.

17. The squat exercise apparatus of claim 9, wherein the lift coupler comprises:
a first linkage connected to the lift arms;
a second linkage connected to the at least one weight movement arm, the second linkage and the first linkage being telescopically movable relative to one another; and
a retaining mechanism releasably retaining the first linkage and the second linkage at a selected one of a plurality of available relative positions.

18. The squat exercise apparatus of claim 17, wherein actuator comprises:
a manual adjustment lever pivotably supported by said one of the lift arms;
a cable extending from the manual adjustment lever to the retaining mechanism such that manual pivoting of the manual adjustment lever releases the retaining mechanism to facilitate movement of the first linkage and the second linkage relative to one another to a different one of the plurality of available relative positions.

19. The squat exercise apparatus of claim 18, wherein the retaining mechanism comprises:
a series of detents along one of the first linkage and the second linkage; and
a detent engaging member movable between a detent engaging position and a withdrawn position, the detent engaging member being resiliently biased towards the detent engaging position.

20. The squat exercise apparatus of claim 19 further comprising a load limiting mechanism operably coupled between the cable and detent engaging member.

21. The squat exercise apparatus of claim 9, wherein the handgrips automatically pivot relative to the lift arms in response to pivoting of the lift arms relative to the support structure.

22. The squat exercise apparatus of claim 9, wherein the actuator comprises a lever extending along an axis of the handgrips, the lever being pivotable towards the handgrip when being actuated from the lift coupler length retaining state to the lift coupler length adjusting state by the hand of the user.

* * * * *